US012812620B2

(12) United States Patent
Park et al.

(10) Patent No.: US 12,812,620 B2
(45) Date of Patent: Nov. 24, 2026

(54) POWER CONTROL AND LINK ADAPTATION ASSOCIATED WITH CROSS-DIVISION DUPLEX (XDD)

(71) Applicant: InterDigital Patent Holdings, Inc., Wilmington, DE (US)

(72) Inventors: Jonghyun Park, Syosset, NY (US); Moon Il Lee, Melville, NY (US); Paul Marinier, Brossard (CA); Young Woo Kwak, Woodbury, NY (US); Ghyslain Pelletier, Montreal (CA); Nazli Khan Beigi, Longueuil (CA)

(73) Assignee: InterDigital Patent Holding, Inc., Wilmington, DE (US)

( * ) Notice: Subject to any disclaimer, the term of this patent is extended or adjusted under 35 U.S.C. 154(b) by 238 days.

(21) Appl. No.: 18/690,143

(22) PCT Filed: Sep. 15, 2022

(86) PCT No.: PCT/US2022/043645

§ 371 (c)(1),
(2) Date: Mar. 7, 2024

(87) PCT Pub. No.: WO2023/043912

PCT Pub. Date: Mar. 23, 2023

(65) Prior Publication Data

US 2025/0203588 A1 Jun. 19, 2025

Related U.S. Application Data

(60) Provisional application No. 63/395,901, filed on Aug. 8, 2022, provisional application No. 63/244,452, filed on Sep. 15, 2021.

(51) Int. Cl.
*H04W 72/0453* (2023.01)
*H04L 1/00* (2006.01)
*H04L 5/00* (2006.01)

(52) U.S. Cl.
CPC ....... *H04W 72/0453* (2013.01); *H04L 1/0009* (2013.01); *H04L 5/0048* (2013.01)

(58) Field of Classification Search
CPC . H04W 72/0453; H04L 1/0009; H04L 5/0048
See application file for complete search history.

(56) References Cited

U.S. PATENT DOCUMENTS

2009/0180406 A1* 7/2009 Breuer ................ H04B 7/2621 370/280
2012/0075989 A1 3/2012 Roessel et al.

(Continued)

FOREIGN PATENT DOCUMENTS

WO 2021253047 A1 12/2021

OTHER PUBLICATIONS

Third Generation Partnership Project (3GPP); "Multiplexing and Channel Coding", Technical Specification Group Radio Access Network; NR; Release 16, 3GPP TS 38.212 V16.6.0, Jun. 2021, 153 pages.

(Continued)

*Primary Examiner* — Mewale A Ambaye
(74) *Attorney, Agent, or Firm* — Flaster Greenberg, P.C.

(57) ABSTRACT

Systems, methods, and instrumentalities are described herein regarding power control and link adaptation for cross-division duplex (XDD). A wireless transmit/receive unit (WTRU) may receive a grant associated with transmission of an uplink (UL) signal. The grant may indicate a first set of resource blocks (RBs). The WTRU may determine a frequency gap (FG) between the first set of RBs and a reference RB. The WTRU may adjust one or more transmit (Tx) parameters based on the determined FG. When the determined FG is less than a pre-defined threshold, the WTRU may reduce one or more of a transmit power or a modulation coding scheme (MCS) level associated with (Continued)

transmission of the UL signal scheduled by the grant. The WTRU may transmit the UL signal using the adjusted one or more Tx parameters.

20 Claims, 9 Drawing Sheets

(56) References Cited

U.S. PATENT DOCUMENTS

| | | | | |
|---|---|---|---|---|
| 2012/0243429 | A1* | 9/2012 | Nakamori | H04L 5/001 370/252 |
| 2022/0369384 | A1* | 11/2022 | Sakhnini | H04L 27/26025 |
| 2023/0354211 | A1* | 11/2023 | Chae | H04W 52/242 |
| 2024/0155574 | A1* | 5/2024 | Hui | H04W 72/0446 |
| 2024/0215106 | A1* | 6/2024 | Elazzouni | H04L 5/0005 |

OTHER PUBLICATIONS

Third Generation Partnership Project (3GPP); "Physical layer procedures for control", Technical Specification Group Radio Access Network; NR; Release 16, 3GPP TS 38.213 V16.6.0, Jun. 2021, 187 pages.

Third Generation Partnership Project (3GPP); "Physical layer procedures for data", Technical Specification Group Radio Access Network; NR; Release 16, 3GPP TS 38.214 V16.6.0, Jun. 2021, 172 pages.

Third Generation Partnership Project (3GPP); "Medium Access Control (MAC) protocol specification", Technical Specification Group Radio Access Network; NR; Release 16, 3GPP TS 38.321 V16.5.0, Jun. 2021, 157 pages.

Third Generation Partnership Project (3GPP); "Radio Resource Control (RRC) protocol specification", Technical Specification Group Radio Access Network; NR; Release 16, 3GPP TS 38.331 V16.5.0, Jun. 2021, 959 pages.

Third Generation Partnership Project (3GPP); "Physical layer measurements", Technical Specification Group Radio Access Network; NR; Release 16, 3GPP TS 38.215 V16.4.0, Dec. 2020, 25 pages.

RWS-210180, "XDD (cross-division duplex) for enhanced duplexing operation in 5G Advanced", Samsung, Jun. 28-Jul. 2, 2021, 8 pages.

* cited by examiner

POWER CONTROL AND LINK ADAPTATION ASSOCIATED WITH CROSS-DIVISION DUPLEX (XDD)

CROSS-REFERENCE TO RELATED APPLICATIONS

This application is the 371 National Stage of International Application No. PCT/US2022/043645, filed Sep. 15, 2022, which claims priority to U.S. provisional patent application No. 63/244,452, filed Sep. 15, 2021, and U.S. provisional patent application No. 63/395,901, filed Aug. 8, 2022, which are incorporated herein by reference in their entirety.

BACKGROUND

Mobile communications using wireless communication continue to evolve. A fifth generation may be referred to as 5G. A previous (legacy) generation of mobile communication may be, for example, fourth generation (4G) long term evolution (LTE).

SUMMARY

Systems, methods, and instrumentalities are described herein regarding power control and link adaptation for cross-division duplex (XDD). Systems, methods, and instrumentalities are described herein regarding subband non-overlapping full duplex (SBFD) operations based on transmit parameter adjustment(s). A wireless transmit/receive unit (WTRU) may (e.g., be configured to) apply a dynamic UL PC and/or a dynamic MCS adjustment (e.g., for XDD). The WTRU may apply a dynamic UL PC and/or a dynamic MCS adjustment for XDD, or a Tx behavior change (e.g., Tx dropping, skipping, stopping, cancelling, and/or deferring or a Tx with modified parameter(s)), for example, if one or more of the following conditions is met: if a frequency gap between a first configured and/or indicated RBs (e.g., for UL Tx) and a second configured and/or indicated RBs (e.g., for DL Rx) on a (e.g., same) symbol/slot is below a first threshold; if a spatial-domain separation between a first configured and/or indicated beam(s)/RS(s)/TCI(s) for UL Tx and a second configured and/or indicated beam(s)/RS(s)/TCI(s) (e.g., for DL Rx) on a (e.g., same) symbol/slot is below a second threshold; if a priority indication for a first configured and/or indicated RBs for UL Tx is given; or the like. Priority rule(s) (e.g., among the conditions and/or criteria described herein) may be pre-defined, configured, or indicated, e.g., on which condition(s) may be applied as higher-priority (e.g., as compared to others).

In examples, the WTRU may determine a first transmission power for a UL transmission if a frequency gap (FG) value for the UL transmission is equal to or less than a threshold. The WTRU may determine a second transmission power for the UL transmission if the FG value for the UL transmission is greater than the threshold. The WTRU may determine one or more power control parameters (e.g., as a function of the FG value), for example, if the WTRU is indicated to do so. The WTRU may determine one or more power control parameters as a function of the FG value and the presence of a DL transmission in the DL resource, for example, which may be used for the FG value determination. The WTRU may (e.g., first) determine UL transmission power (e.g., without considering the FG value). The WTRU may scale (e.g., using a scaling factor) the transmission power of (e.g., each) frequency resource, for example, based on its associated FG value.

In examples, the WTRU may apply a second MCS (e.g., instead of applying a first MCS schedule, configured, and/or indicated for the UL or DL resource) where the second MCS may have a J-level MCS difference compared to the first MCS, for example, if one or more of the above conditions and/or criteria (e.g., as described herein) is/are met. The WTRU may be configured with more than one value/parameter of J. The WTRU may be configured with $J_1$, $J_2$, etc. (e.g., as multiple candidate MCS adjustment values/parameters, for example, to apply multi-level dynamic MCS adjustment). The WTRU may (e.g., be configured and/or indicated/switched to) apply a joint UL PC and MCS adjustment behavior. The WTRU may apply a WTRU-initiated MCS adjustment, for example, if a (e.g., more than X dB) dynamic UL PC reduction is applied.

A WTRU may be configured to receive a grant for transmission of an UL signal (e.g., in one or more mixed UL/DL symbol). In response to receiving the grant, the WTRU may determine a frequency gap (FG) as a value between a (e.g., first or last) RB of the UL grant and the closest reference RB (e.g., Ref RB-A, Ref RB-B, Ref RB-C, or Ref RB-D). The WTRU may adjust a Tx parameter (e.g., MCS, link adaptation (LA), and/or power control (PC) parameter), for example, based on the determined FG value. In examples, if the FG value is less than a pre-defined or pre-configured threshold, the WTRU may reduce a transmit power and/or reduce an MCS value/level for transmission of the UL signal scheduled by the grant. The WTRU may apply multi-level MCS/PC/LA adjustments based on using multiple thresholds (e.g., if configured). The WTRU may transmit the UL signal using the determined or adjusted Tx parameter(s) (e.g., MCS, LA, and/or PC parameter(s)).

DETAILED DESCRIPTION

Figure 1A:
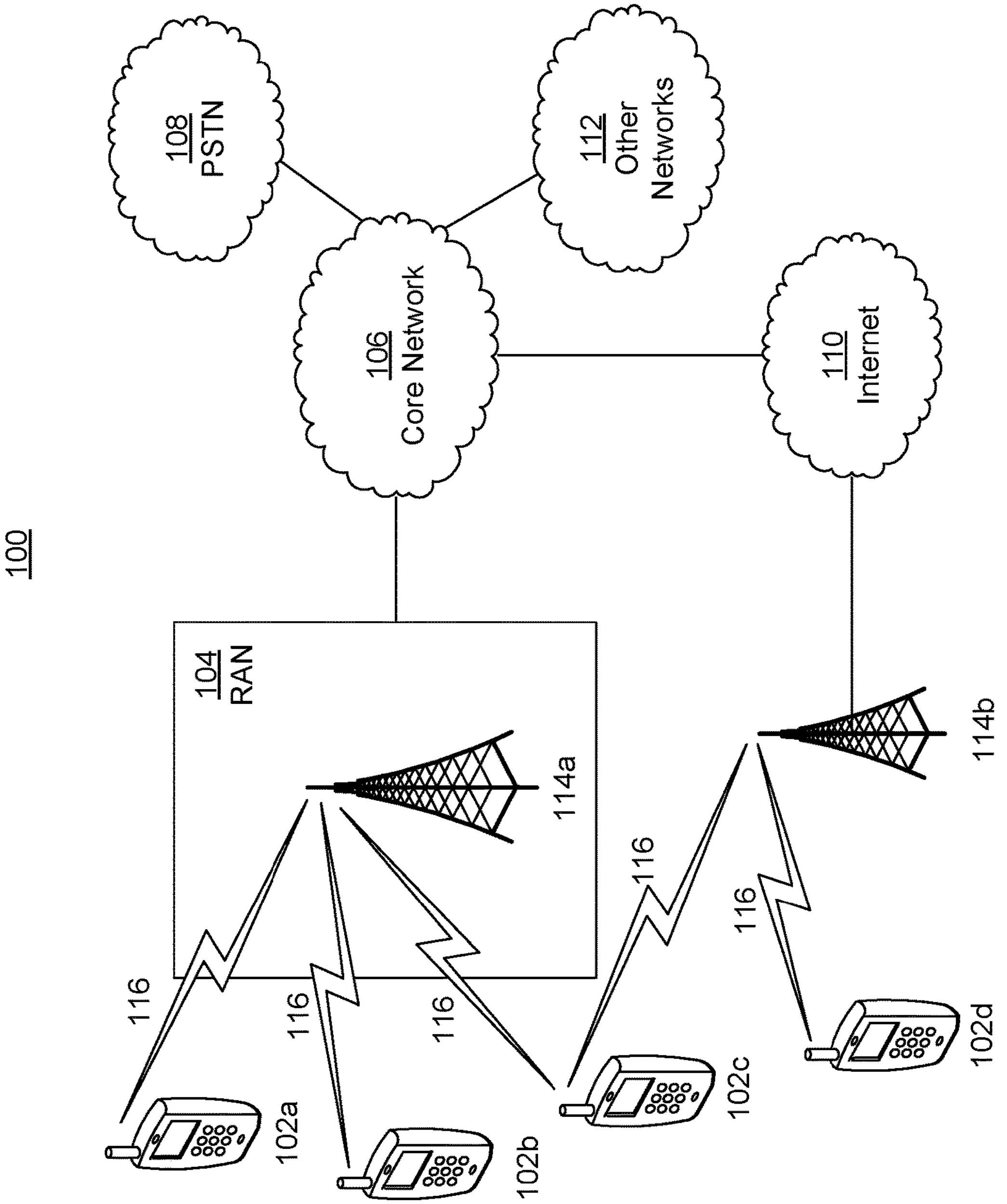
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system

100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform (DFT)-Spread OFDM (ZT UW DTS-s OFDM), unique word OFDM (UW-OFDM), resource block-filtered OFDM, filter bank multicarrier (FBMC), and the like.

As shown in FIG. 1A; the communications system 100 may include wireless transmit/receive units (WTRUs) 102*a*, 102*b*, 102*c*, 102*d*, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c*, and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d* to facilitate access to one or more communication networks, such as the CN 106/115, the Internet 110, and/or the other networks 112. By way of example, the base stations 114*a*, 114*b* may be a base transceiver station (BTS), a Node-B, an eNode B (eNB), a Home Node B, a Home eNode B, a gNode B (gNB), a NR NodeB, a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in one embodiment, the base station 114*a* may include three transceivers, i.e., one for each sector of the cell. In an embodiment, the base station 114*a* may employ multiple-input multiple output (MIMO) technology and may utilize multiple transceivers for each sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In other embodiments, the base station 114*a* and the WTRUs 102*a*, 102*b*, 102*c* may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In yet another embodiment, the base station 114*b* and the WTRUs 102*c*, 102*d* may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102*a*, 102*b*, 102*c*, 102*d* to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
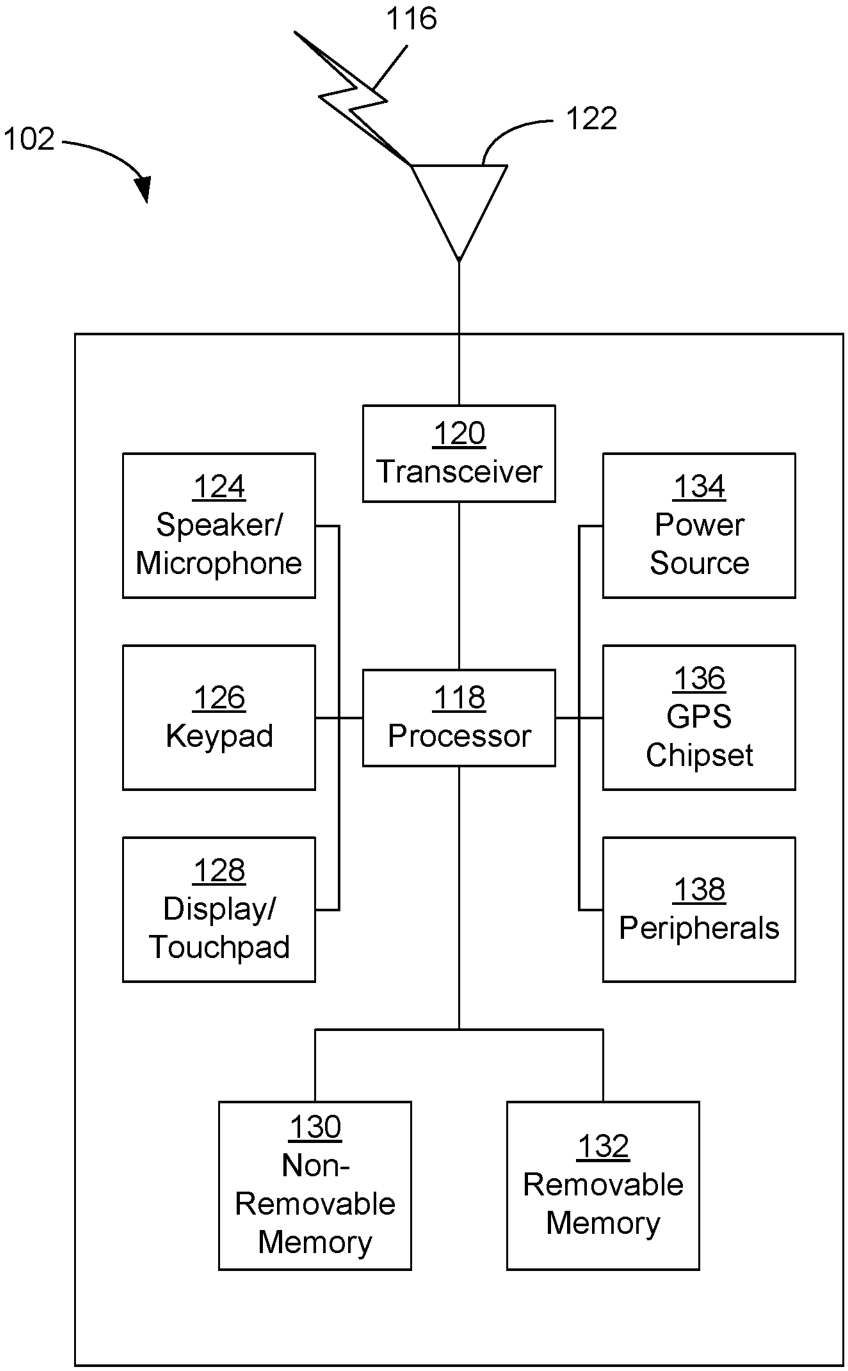
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 18 as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WRTU 102 may include a half-duplex radio for which transmission and reception of some or all of the signals (e.g., associated with particular subframes for either the UL (e.g., for transmission) or the downlink (e.g., for reception)).

Figure 1C:
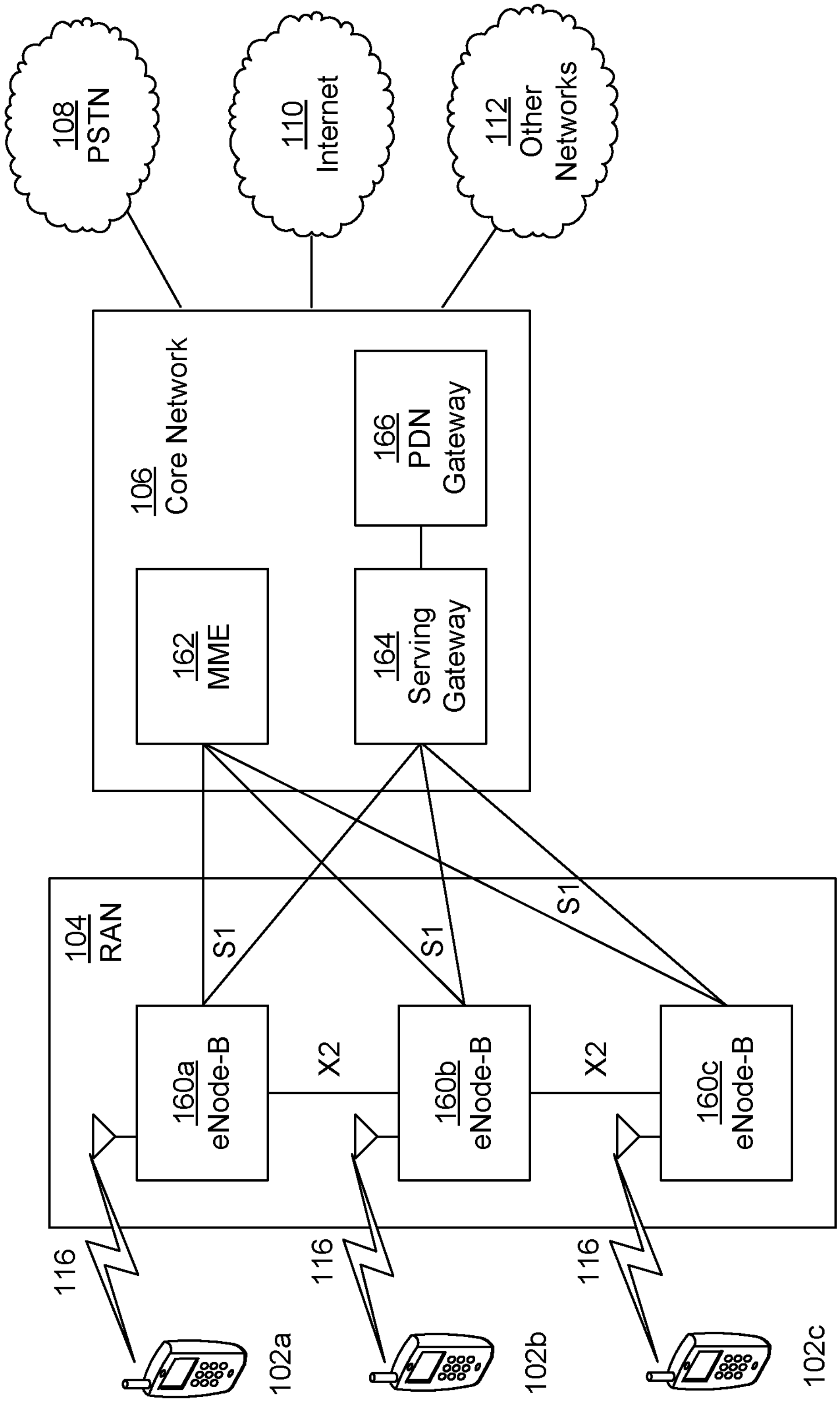
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In one embodiment, the eNode-Bs 160*a*, 160*b*, 160*c* may implement MIMO technology. Thus, the eNode-B 160*a*, for example, may use multiple antennas to transmit wireless signals to, and/or receive wireless signals from, the WTRU 102*a*.

Each of the eNode-Bs 160*a*, 160*b*, 160*c* may be associated with a particular cell (not shown) and may be configured to handle radio resource management decisions, handover decisions, scheduling of users in the UL and/or DL, and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements is depicted as part of the CN 106, it will be appreciated that any of these elements may be owned and/or operated by an entity other than the CN operator.

The MME 162 may be connected to each of the eNode-Bs 162*a*, 162*b*, 162*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108.

In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
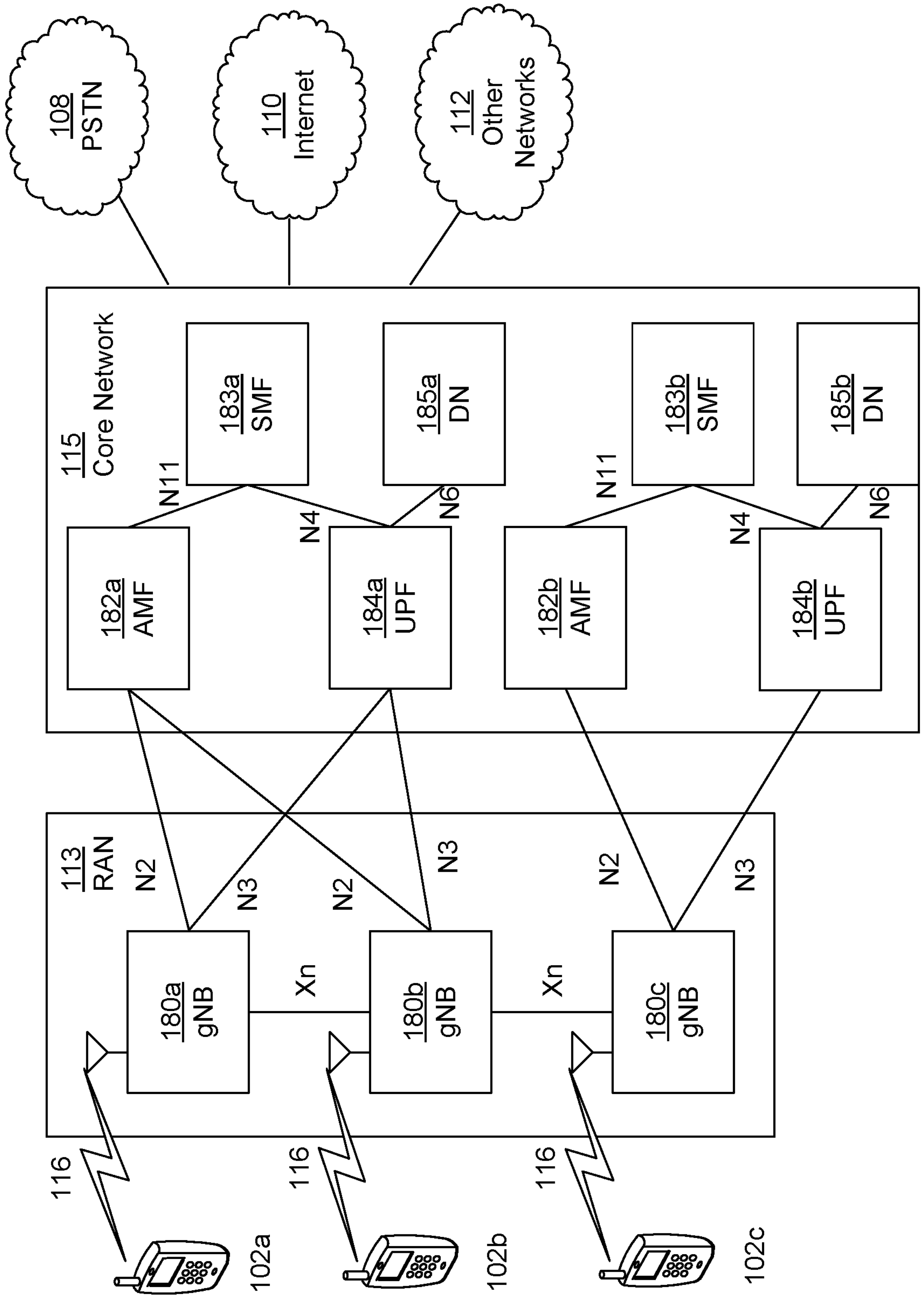
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In one embodiment, the gNBs 180*a*, 180*b*, 180*c* may implement MIMO technology. For example, gNBs 180*a*, 108*b* may utilize beamforming to transmit signals to and/or receive signals from the gNBs 180*a*, 180*b*, 180*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (CoMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, the OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., containing varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different PDU sessions with different requirements), selecting a particular SMF 183*a*, 183*b*, management of the registration area, termination of NAS signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Systems, methods, and instrumentalities are described herein regarding power control and link adaptation for cross-division duplex (XDD). A wireless transmit/receive unit (WTRU) may (e.g., be configured to) apply a dynamic UL PC and/or a dynamic MCS adjustment (e.g., for XDD). The WTRU may apply a dynamic UL PC and/or a dynamic MCS adjustment for XDD, or a Tx behavior change (e.g., Tx dropping, skipping, stopping, cancelling, and/or deferring or a Tx with modified parameter(s)), for example, if at least one of the following conditions is met: if a frequency gap between a first configured and/or indicated RBs (e.g., for UL Tx) and a second configured and/or indicated RBs (e.g., for DL Rx) on a (e.g., same) symbol/slot is below a first threshold; if a spatial-domain separation between a first configured and/or indicated beam(s)/RS(s)/TCI(s) for UL Tx and a second configured and/or indicated beam(s)/RS(s)/TCI(s) (e.g., for DL Rx) on a (e.g., same) symbol/slot is below a second threshold; if a priority indication for a first configured and/or indicated RBs for UL Tx is given; or the like. Priority rule(s) (e.g., among the conditions and/or criteria described herein) may be pre-defined, configured, or indicated, e.g., on which condition(s) may be applied as higher-priority (e.g., as compared to others).

In examples, the WTRU may determine a first transmission power for a UL transmission if a frequency gap (FG) value for the UL transmission is equal to or less than a threshold. The WTRU may determine a second transmission power for the UL transmission if the FG value for the UL transmission is greater than the threshold. The WTRU may determine one or more power control parameters (e.g., as a function of the FG value), for example, if the WTRU is indicated to do so. The WTRU may determine one or more power control parameters as a function of the FG value and the presence of a DL transmission in the DL resource, for example, which may be used for the FG value determination. The WTRU may (e.g., first) determine UL transmission power (e.g., without considering the FG value). The WTRU may scale (e.g., using a scaling factor) the transmission power of (e.g., each) frequency resource, for example, based on its associated FG value.

In examples, the WTRU may apply a second MCS (e.g., instead of applying a first MCS schedule, configured, and/or indicated for the UL or DL resource) where the second MCS may have a J-level MCS difference compared to the first MCS, for example, if at least one of the above conditions and/or criteria (e.g., as described herein) is/are met. The WTRU may be configured with more than one value/parameter of J. The WTRU may be configured with $J_1$, $J_2$, etc. (e.g., as multiple candidate MCS adjustment values/parameters, for example, to apply multi-level dynamic MCS adjustment). The WTRU may (e.g., be configured and/or indicated/switched to) apply a joint UL PC and MCS adjustment behavior. The WTRU may apply a WTRU-initiated MCS adjustment, for example, if a (e.g., more than X dB) dynamic UL PC reduction is applied.

Dynamic time division duplex (e.g., TDD) may be supported (e.g. in NR), for example, by a group-common (e.g., GC) DCI (e.g., format 2_0 as shown in Table 1) which may indicate a slot format and/or semi-static configurations of tdd-UL-DL-config-common/dedicated (e.g., where each slot/symbol can be one of DL, UL, or Flexible).

TABLE 1+11

Slot formats for normal cyclic prefix

| For- | Symbol number in a slot | | | | | | | | | | | | | |
|---|---|---|---|---|---|---|---|---|---|---|---|---|---|---|
| mat | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | F | F | F | F | F | F | F | F | F | F | F | F | F | F |
| 3 | D | D | D | D | D | D | D | D | D | D | D | D | D | F |
| 4 | D | D | D | D | D | D | D | D | D | D | D | D | F | F |
| | . . . | | | | | | | | | | | | | |
| 54 | F | F | F | F | F | F | F | D | D | D | D | D | D | D |
| 55 | D | D | F | F | F | U | U | U | D | D | D | D | D | D |
| 56-254 | Reserved | | | | | | | | | | | | | |
| 255 | UE determines the slot format for the slot based on tdd-UL-DL-ConfigurationCommon, or tdd-UL-DL-ConfigurationDedicated and, if any, on detected DCI formats | | | | | | | | | | | | | |

Figure 2:
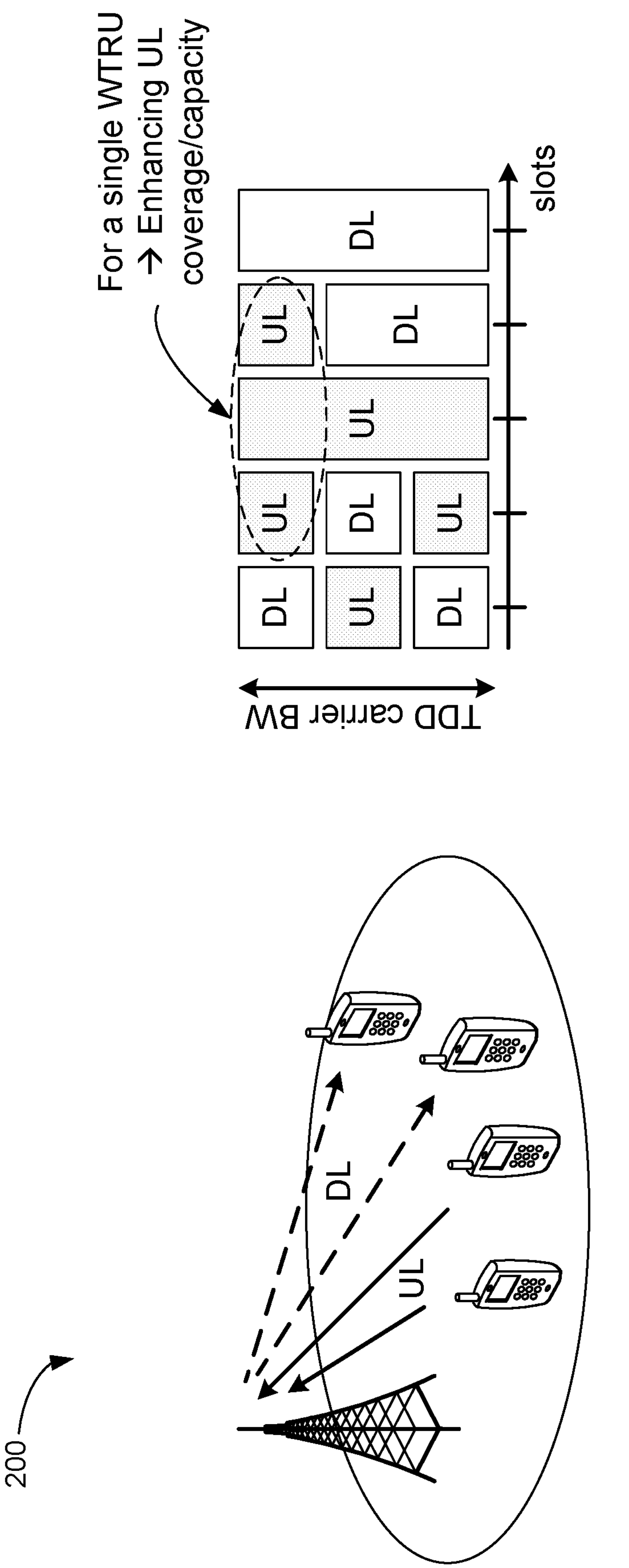
FIG. 2 illustrates an example FD-gNB and HD-WTRUs in a cell.

Duplexing may be assumed to use half duplex (HD), for example, for both a network (e.g., gNB) and a WTRU. Full duplex (FD) may be supported. Full duplex may be supported (e.g., by enhancements), at least for a network/gNB (e.g., and also for WTRUs, which may include integrated access and backhaul (IAB) devices). FIG. 2 illustrates an example FD-gNB and HD-WTRUs in a cell. Cross division duplex (XDD) (e.g., sub-band level FD, as illustrated in FIG. 2) may offer reduced FD implementation complexity, for example, in terms of cancelling self-interference (SI) and mitigating cross-link interference (CLI), e.g., at the transmitter (e.g., at the gNB).

In examples (e.g., where a granularity of the subband for XDD may be a configurable group of RBs), a network (e.g., gNB) may flexibly configure/schedule/indicate (e.g., to a first WTRU) transmission of a UL resource (e.g., PUSCH, PUCCH, SRS) over a first set of RBs, for example, which may be adjacent to a second set of RBs for DL reception by a second WTRU (e.g., in terms of XDD). If the first WTRU and the second WTRU are located close to each other, the first WTRU's transmission of the UL resource may cause a WTRU-to-WTRU CLI (e.g., CLI leakage), for example, on the adjacent second set of RBs for the second WTRU's DL reception. Dynamic CLI leakage problems may exist on adjacent DL and UL subbands.

Hereinafter, the phrases a, an, and similar phrases may be interpreted as one or more or at least one. Any term which ends with the suffix (s) may be interpreted as one or more or at least one. The term may can be interpreted as the phrase may, for example.

The term subband may refer to a frequency-domain resource and may be characterized by one or more of the following: a set of resource blocks (RBs); a set of resource block sets (RB sets) (e.g., if a carrier has intra-cell guard bands); a set of interlaced resource blocks; a bandwidth part (e.g., or portion of a bandwidth part); or a carrier (e.g., or portion of a carrier).

For example, a subband may be characterized by a starting RB and number of RBs for a set of contiguous RBs (e.g., within a bandwidth part). A subband may be defined by the value of a frequency-domain resource allocation field and bandwidth part index.

The term XDD may refer to a subband-wise duplex (e.g., either UL or DL being used per subband), and may be characterized by one or more of the following: cross division duplex (e.g., subband-wise FDD within a TDD band); subband-based full duplex (e.g., full duplex as both UL and DL may be used/mixed on a symbol/slot, and either UL or DL may be used per subband on the symbol/slot); frequency-domain multiplexing (FDM) of DL/UL transmissions (e.g., within a TDD spectrum); a subband non-overlapping full duplex (e.g., non-overlapped sub-band full-duplex); a full duplex other than a same-frequency (e.g., spectrum sharing, subband-wise-overlapped) full duplex; or an advanced duplex method (e.g., other than TDD or FDD, such as pure TDD or pure FDD).

The term MCS adjustment may refer to a (e.g., WTRU-initiated/oriented) MCS change/adjustment from a schedule, configured, and/or indicated MCS level for a UL (or DL) resource. MCS adjustment may be used as a representative name for the (e.g., WTRU-initiated/oriented) MCS change/adjustment, e.g., but is not limited to only a specific example.

For example, the term MCS adjustment may imply an MCS change between a first MCS (e.g., schedule, configured, and/or indicated associated with a UL (or DL) resource) and a second (e.g., alternate) MCS. A WTRU may determine the second MCS, for example, from the MCS adjustment (e.g., but not necessarily from the MCS adjustment). In examples, the first MCS may be an MCS configured or activated for configured grant type 1 or 2 (e.g., for UL), an MCS in SPS activation command (e.g., for DL), or an MCS indicated in DCI (e.g., for dynamic grant or dynamic assignment, etc.).

The term dynamic/flexible TDD may refer to a TDD system/cell which may dynamically and/or flexibly change, adjust, and/or switch a communication direction (e.g., a downlink, an uplink, or a sidelink, etc.) on a time instance (e.g., slot, symbol, subframe, and/or the like). In an example, in a system employing dynamic/flexible TDD, a component carrier(CC) or a bandwidth part (BWP) may have one single type among 'D', 'U', and 'F' on a symbol/slot, based on an indication by a group-common(GC)-DCI (e.g., format 2_0) comprising a slot format indicator (SFI), and/or based on tdd-UL-DL-config-common/dedicated configurations. On a given time instance/slot/symbol, a first gNB (e.g., cell, TRP) employing dynamic/flexible TDD may transmit a downlink signal to a first WTRU being communicated/associated with the first gNB based on a first SFI and/or tdd-UL-DL-config configured and/or indicated by the first gNB, and a second gNB (e.g., cell, TRP) employing dynamic/flexible TDD may receive an uplink signal transmitted from a second WTRU being communicated/associated with the second gNB based on a second SFI and/or tdd-UL-DL-config configured and/or indicated by the second gNB. In an example, the first WTRU may determine that the reception of the downlink signal is being interfered by the uplink signal, where the interference caused by the uplink signal may refer to a WTRU-to-WTRU cross-layer interference (CLI).

A WTRU may transmit or receive a physical channel or reference signal according to one or more spatial domain filter. The term beam may refer to a spatial domain filter.

The WTRU may transmit a physical channel or signal using the same spatial domain filter as the spatial domain filter used for receiving an RS (such as CSI-RS) or a SS block. The WTRU transmission may be referred to as a target, and the received RS or SS block may be referred to as a reference or a source. In such case, the WTRU may be said to transmit the target physical channel or signal according to a spatial relation with a reference to such RS or SS block.

The WTRU may transmit a first physical channel or signal according to the same spatial domain filter as the spatial domain filter used for transmitting a second physical channel or signal. The first and second transmissions may be referred, to as target(s), reference(s), and/or source(s), respectively. In such case, the WTRU may be said to transmit the first (e.g., target) physical channel or signal according to a spatial relation with a reference to the second (e.g., reference) physical channel or signal.

A spatial relation may be implicit, configured by RRC, and/or signaled by MAC CE or DCI. For example, a WTRU may implicitly transmit PUSCH and DM-RS of PUSCH according to the same spatial domain filter as an SRS indicated by an SRI indicated in DCI or configured by RRC. In another example, a spatial relation may be configured by RRC for an SRS resource indicator (SRI) or signaled by MAC CE for a PUCCH. Such spatial relation may also be referred to as a beam indication.

The WTRU may receive a first (e.g., target) downlink channel or signal according to the same spatial domain filter or spatial reception parameter as a second (e.g., reference) downlink channel or signal. For example, such association may exist between a physical channel such as PDCCH or PDSCH and its respective DM-RS. At least when the first and second signals are reference signals, such association may exist when the WTRU is configured with a quasi-colocation (QCL) assumption type D between corresponding antenna ports. Such association may be configured as a transmission configuration indicator (TCI) state. A WTRU may be indicated an association between a CSI-RS or SS block and a DM-RS by an index to a set of TCI states configured by RRC and/or signaled by MAC CE. Such indication may also be referred to as a beam indication.

A TRP (e.g., transmission and reception point) may be interchangeably used herein with one or more of transmission point (TP), reception point (RP), radio remote head (RRH), distributed antenna (DA), base station (BS), a sector (e.g., of a BS), and a cell (e.g., a geographical cell area served by a BS). Multi-TRP may be interchangeably used herein with one or more of MTRP, M-TRP, and/or multiple TRPs.

A WTRU may report a subset of channel state information (CSI) components, where CSI components may correspond to at least a CSI-RS resource indicator (CRI), a SSB resource indicator (SSBRI), an indication of a panel used for reception at the WTRU (e.g., such as a panel identity or group identity), measurements such as L1-RSRP, L1-SINR taken from SSB or CSI-RS (e.g., cri-RSRP, cri-SINR, ssb-Index-RSRP, ssb-Index-SINR), and/or other channel state information such as one or more of rank indicator (RI), channel quality indicator (CQI), precoding matrix indicator (PMI), Layer Index (LI), and/or the like.

WTRU may receive a synchronization signal/physical broadcast channel (SS/PBCH) block (SSB). The SSB may include a primary synchronization signal (PSS), secondary synchronization signal (SSS), and/or physical broadcast channel (PBCH). The WTRU may monitor, receive, and/or attempt to decode an SSB during initial access, initial synchronization, radio link monitoring (RLM), cell search, cell switching, and so forth.

A WTRU may measure and report the channel state information (CSI). The CSI for each connection mode may include or be configured with one or more of a CSI report configuration, a CSI-RS resource set, and/or one or more NZP CSI-RS resources. A CSI Report Configuration may include a CSI report quantity (e.g., Channel Quality Indicator (CQI), Rank Indicator (RI), Precoding Matrix Indicator (PMI), CSI-RS Resource Indicator (CRI), Layer Indicator (LI), etc.), a CSI report type (e.g., aperiodic, semi persistent, periodic), a CSI report codebook configuration (e.g., Type I, Type II, Type II port selection, etc.), and/or a CSI report frequency.

A CSI-RS Resource Set may include one or more of the following CSI Resource settings: an NZP-CSI-RS Resource for channel measurement, an NZP-CSI-RS Resource for interference measurement, and/or a CSI-IM Resource for interference measurement.

NZP CSI-RS Resources may include an NZP CSI-RS Resource ID, a periodicity and offset, QCL Info and TCI-state, and/or a resource mapping (e.g., number of ports, density, CDM type, etc.).

A WTRU may indicate, determine, and/or be configured with one or more reference signals. The WTRU may monitor, receive, and/or measure one or more parameters based on the respective reference signals. For example, one or more of the following may apply. The following parameters are non-limiting examples of the parameters that may be included in reference signal(s) measurements. One or more of these parameters may be included. Other parameters may be included.

SS reference signal received power (SS-RSRP) may be measured based on the synchronization signals (e.g., demodulation reference signal (DMRS) in PBCH or SSS). SS-RSRP may be defined as the linear average over the power contribution of the resource elements (RE) that carry the respective synchronization signal. In measuring the RSRP, power scaling for the reference signals may be performed. In case SS-RSRP is used for L1-RSRP, the measurement may be accomplished based on CSI reference signals in addition to the synchronization signals.

CSI-RSRP may be measured based on the linear average over the power contribution of the resource elements (RE) that carry the respective CSI-RS. The CSI-RSRP measurement may be configured within measurement resources for the configured CSI-RS occasions.

SS signal-to-noise and interference ration (SS-SINR) may be measured based on the synchronization signals (e.g., DMRS in PBCH or SSS). SS-SINR may be defined as the linear average over the power contribution of the resource elements (RE) that carry the respective synchronization signal divided by the linear average of, the noise and interference power contribution. In case SS-SINR is used for L1-SINR, the noise and interference power measurement may be accomplished based on resources configured by higher layers.

CSI-SINR may be measured based on the linear average over the power contribution of the resource elements (RE) that carry the respective CSI-RS divided by the linear average of the noise and interference power contribution. When CSI-SINR is used for L1-SINR, the noise and interference power measurement may be accomplished based on resources configured by higher layers. Otherwise, the noise and interference power may be measured based on the resources that carry the respective CSI-RS.

Received signal strength indicator (RSSI) may be measured based on the average of the total power contribution in configured OFDM symbols and bandwidth. The power contribution may be received from different resources (e.g., co-channel serving and non-serving cells, adjacent channel interference, thermal noise, and so forth).

Cross-Layer interference received signal strength indicator (CLI-RSSI) may be measured based on the average of the total power contribution in configured OFDM symbols of the configured time and frequency resources. The power contribution may be received from different resources (e.g., cross-layer interference, co-channel serving and non-serving cells, adjacent channel interference, thermal noise, and so forth).

Sounding reference signals RSRP (SRS-RSRP) may be measured based on the linear average over the power contribution of the resource elements (RE) that carry the respective SRS.

A property of a grant or assignment may include one or more of a frequency allocation; an aspect of time allocation (e.g., such as a duration); a priority; a modulation and coding scheme; a transport block size; a number of spatial layers; a number of transport blocks; a TCI state, CRI, or SRI; a number of repetitions; whether the repetition scheme is Type A or Type B; whether the grant is a configured grant type 1, type 2 or a dynamic grant; whether the assignment is a dynamic assignment or a semi-persistent scheduling (configured) assignment; a configured grant index or a semi-persistent assignment index; a periodicity of a configured grant or assignment; a channel access priority class (CAPC); and/or any other parameter provided in a DCI, by MAC or by RRC for the scheduling the grant or assignment.

An indication by DCI may include an explicit indication by a DCI field or by RNTI used to mask CRC of the PDCCH. An indication by DCI may include an implicit indication by a property such as DCI format, DCI size, Coreset or search space, Aggregation Level, first resource element of the received DCI (e.g., index of first Control Channel Element), where the mapping between the property and the value may be signaled by RRC or MAC.

RS may be interchangeably used herein with one or more of RS resource, RS resource set, RS port, and/or RS port group.

RS may be interchangeably used herein with one or more of SSB, CSI-RS, SRS, and/or DM-RS.

A WTRU may be configured to adjust one or more Tx parameters for an UL signal based on a frequency gap, a spatial domain separation, and/or a priority indication. For example, the WTRU may adjust a transmit power or a modulation coding scheme (MCS) level based on the frequency gap, the spatial domain separation, and/or the priority indication. The UL signal may be associated with one or more RBs proximate to (e.g., adjacent to) one or more sets of DL RBs. When a the one or more RBs for the UL signal are close in frequency to the one or more sets of DL RBs, cross-link interference (CLI) may result. The WTRU may adjust the one or more Tx parameters for the UL signal to reduce CLI.

The frequency gap may be a value between a (e.g., first or last) RB of the UL signal and a reference symbol (e.g., a closest reference symbol). The spatial domain separation may be a value of separation between a beam/TCI associated with the UL signal and a DL reference beam/TCI. The WTRU may adjust the one or more Tx parameters when the spatial domain separation is less than a pre-determined threshold. The priority indication may be associated with the UL signal. The WTRU may adjust the one or more Tx parameters when the priority indicated by the priority indication is above a pre-determined threshold and/or level. The adjustment of the one or more Tx parameters may be dynamic. For example, the WTRU may adjust the one or more Tx parameters for each Dynamic UL PC and/or dynamic MCS adjustment may be applied (e.g., for XDD). In examples, a WTRU may (e.g., be configured to) apply a dynamic UL PC and/or a dynamic MCS adjustment (e.g., for XDD) or a Tx behavior change (e.g., Tx dropping, skipping, stopping, cancelling, and/or deferring or a Tx with modified parameter(s)), for example, if one or more of the following conditions is met: a frequency gap between first configured, scheduled, and/or indicated RBs (e.g., for an UL Tx) and second configured, scheduled, and/or indicated RBs (e.g., for a DL Rx) on a (e.g., same) symbol/slot is below a first threshold; a spatial-domain separation between a first configured, activated, and/or indicated beam(s)/RS(s)/TCI(s) (e.g., for UL Tx) and a second configured, activated, and/or indicated beam(s)/RS (s)/TCI(s) (e.g., for DL Rx) on a (e.g., same) symbol/slow is below a second threshold (e.g., beam-index wise, or based on a pre-configured rule across multiple beam configuration candidates); or a priority indication for a first configured, scheduled, and/or indicated RB (e.g., for UL Tx) is provided. A beam configuration may represent a beam/RS/TCI (e.g., one or more beams for a transmission or reception, one or more RSs for a transmission or reception, and/or TCI for a Tx or Rx). TCI may include beam information, timing information, and/or doppler related information. Beam configuration may be used interchangeably herein with beam/RS/TCI.

The WTRU may (e.g., be configured to) apply a dynamic UL PC and/or a dynamic MCS adjustment (e.g., for XDD) or a Tx behavior change (e.g., Tx dropping, skipping, stopping, cancelling, deferring, and/or a Tx with modified parameter(s)), for example, if a frequency gap between first configured, scheduled, and/or indicated RBs (e.g., for an UL Tx) and second configured, scheduled, and/or indicated RBs (e.g., for a DL Rx) on a (e.g., same) symbol/slot is below a first threshold. The WTRU to transmit a UL resource over the first RBs may identify the frequency location of the second RBs, for example, to compare for assessment of the condition and/or criteria (e.g., determine whether the frequency gap is below the first threshold).

The frequency location of the second RBs may be known, identified, and/or determined, for example, based on a mixed(UL/DL) slot/symbol-type configuration and/or indication, e.g., by an enhanced tdd-UL-DL-config comprising the mixed slot/symbol-type. In examples, a mixed (e.g., UL/DL) slot/symbol-type may indicate a slot/symbol that can be used for both DL and UL, for example, each being allocated with (e.g., non-overlapping) independent RB(s) on the slot/symbol, e.g., for XDD (e.g., at a gNB side).

In examples, the independent RB(s) on the slot/symbol for the (e.g., each of the) DL and UL may be partially or fully overlapped, for example, based on a network's (e.g., gNB's) configuration and/or indication to a WTRU.

In examples, if a slot/symbol for transmission of the UL resource corresponds to a mixed slot/symbol-type (e.g., configured and/or indicated to the WTRU), the WTRU can determine the frequency gap between the first RBs for the UL Tx and any (e.g., nearest) RB belonging to RB(s) corresponding to DL of the mixed slot/symbol-type.

In examples, the WTRU may receive subband-specific slot format indication(s) and determine the frequency gap from the configured subbands and slot format combinations.

The frequency location of the second RBs may be (e.g., explicitly) informed, configured, and/or indicated (e.g., by the network, such as from the gNB) to the WTRU (e.g., as muted (e.g., DL) RB(s), muted (e.g., DL) frequency region(s), indicated (e.g., DL) RB(s) for muting, puncturing, skipping, interrupting, and/or flipping, or indicated (e.g., DL) RB(s) for particular purpose(s) including the purpose indicating the frequency gap, etc.), e.g., via MAC-CE signaling and/or DCI signaling. In examples, the explicit signaling may include information related to DL RB(s) (e.g., allocated for a second WTRU), for example, where information related to the second WTRU may be (e.g., additionally) signaled and/or indicated to the WTRU (e.g., to support/help a WTRU-to-WTRU CLI mitigation behavior to be performed at the WTRU, etc.).

In examples, the information related to the second WTRU may comprise information related to a WTRU ID (e.g., corresponding to the second WTRU), for example, where the WTRU ID may be a parameter configured to the second WTRU. The information related to the WTRU ID may comprise and/or indicate an RNTI (e.g., C-RNTI, etc.) and/or a sequence initialization or scrambling parameter (e.g., configured for the second WTRU).

The WTRU may (e.g., be configured to) receive (e.g., overhear) a DCI transmitted for the second WTRU. Based on (e.g., directly) receiving the DCI, the WTRU may determine and/or identify the frequency location of the second RBs (e.g., which may comprise scheduled RB(s) for the second WTRU).

In examples, the information related to the second WTRU may comprise information related to beam(s)/RS(s)/TCI(s) (e.g., associated with the DL RB(s)) and/or parameter(s) for a signal strength/quality metric (e.g., RSRP, L1-RSRP, cri-RSRP, ssb-Index-RSRP, L1-SINR, and/or SRS-RSRP, etc.), e.g., associated with the beam(s)/RS(s)/TCI(s).

In examples, an RS of the beam(s)/RS(s)/TCI(s) may be an SRS, and a parameter for the signal strength/quality metric may be an SRS-RSRP, for example, where the SRS-RSRP may be determined (e.g., by the second WTRU), e.g., based on measuring the SRS.

The frequency location of the second RBs may be implicitly identified and/or determined by the WTRU, e.g., based on a pre-defined and/or pre-configured rule. In examples, the pre-defined rule may be that the second RBs used to compare for assessment of the condition and/or criteria (e.g., to determine whether the frequency gap is below the first threshold) is one or more set of previously received, monitored, and/or measured DL RB(s) at the WTRU. The one or more set may be the most recently received, monitored, and/or measured DL RB(s). The one or more set may be a union of X(>1) most recently received, monitored, and/or measured DL RB(s) and/or within a pre-defined and/or pre-configured time window parameter and/or value.

The first threshold value may be pre-defined, pre-configured, identified, and/or indicated to the WTRU, e.g., as Y(1) RB(s). In examples, if Y=2, the condition and/or criteria to apply the dynamic UL PC and/or the dynamic MCS adjustment (e.g., for XDD) may be met if the frequency gap between the first RBs for UL and the second RBs for DL is less than or equal to Y=2 RBs.

In examples, a multi-level threshold and correspondingly applying a multi-level dynamic UL PC for XDD may be configured and/or applicable to the WTRU. In examples, two values of the threshold may be configured to the WTRU as Y1=2 and Y2=5. If the frequency gap between the first RBs for UL and the second RBs for DL is less than or equal to Y1=2 RBs, the WTRU may apply a level-1 dynamic UL PC operation, e.g., P1 dB UL power reduction. If the frequency gap between the first RBs for UL and the second RBs for DL is between Y1=2 RBs and Y2=5 RBs, the WTRU may apply a level-2 dynamic UL PC operation, e.g., P2 (e.g., where P2<P1) dB UL power reduction. If the frequency gap between the first RBs for UL and the second RBs for DL is larger than Y2=5 RBs, the WTRU may refrain from applying (e.g., does not apply) a dynamic UL PC operation (e.g., for XDD).

Multi-level threshold and correspondingly applying multi-level dynamic (UL) MCS adjustment (e.g., for XDD)

may be configured and/or applicable to the WTRU. In examples, two values of the threshold may be configured to the WTRU as Y1=2 and Y2=5. If the frequency gap between the first RBs for UL and the second RBs for DL is less than or equal to Y1=2 RBs, the WTRU may apply level-1 dynamic MCS adjustment, e.g., Q1-level MCS down from a schedule, configured, and/or indicated MCS level for the UL resource. If the frequency gap between the first RBs for UL and the second RBs for DL is between Y1=2 RBs and Y2=5 RBs, the WTRU may apply a level-2 dynamic MCS adjustment, e.g., Q2-level MCS down from the schedule, configured, and/or indicated MCS level for the UL resource. If the frequency gap between the first RBs for UL and the second RBs for DL is larger than Y2=5 RBs, the WTRU may refrain from applying (e.g., does not apply) a dynamic MCS adjustment (for XDD).

Figure 3:
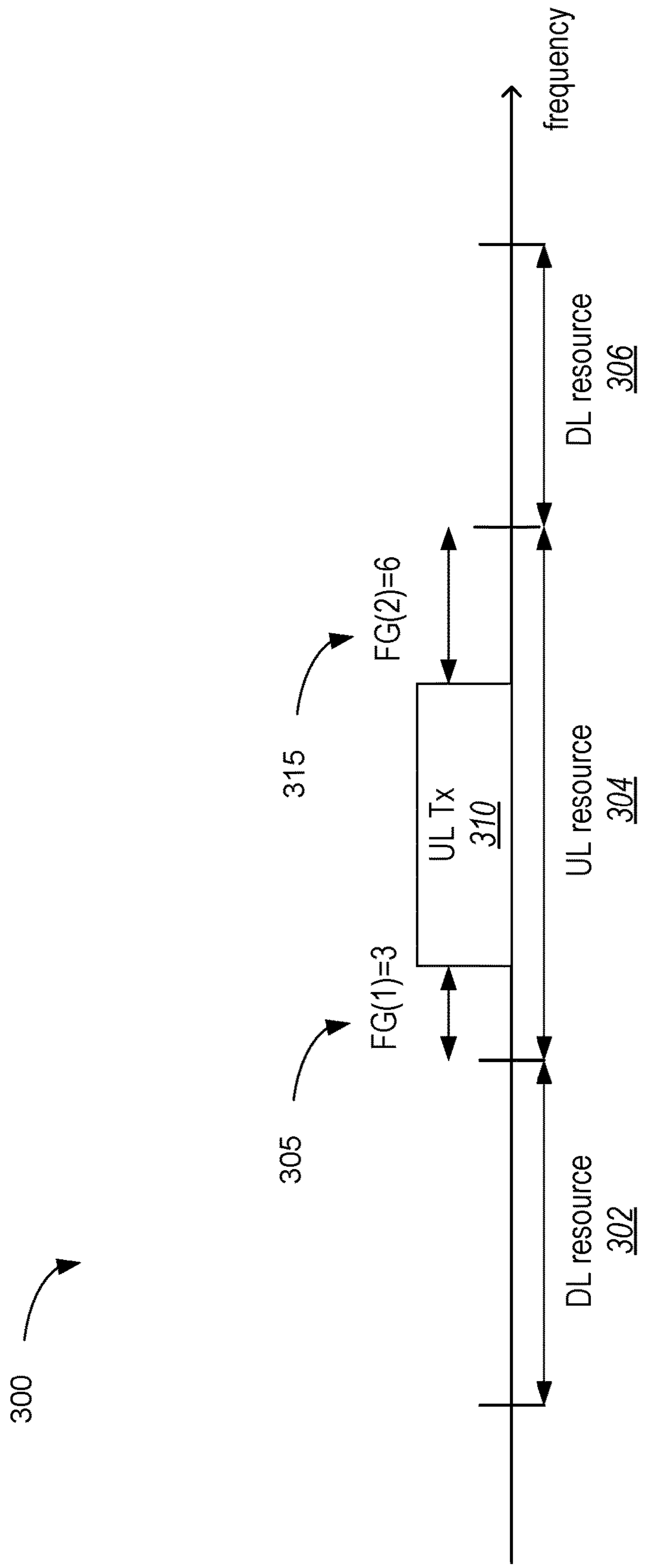
FIG. 3 illustrates an example frequency gap for an allocated resource for a UL transmission (e.g., UL Tx) within a UL resource.

FIG. 3 illustrates an example frequency gap 300 for an allocated resource for an UL transmission 310 (e.g., UL Tx) within a UL resource 304. A frequency gap may be a frequency distance between the allocated UL resource and an adjacent resource (e.g., DL resource) determined, scheduled, configured, and/or allocated in a slot. A frequency gap may define a frequency spacing between the allocated resource and the adjacent (e.g., downlink) resource in a slot.

For example, the UL Tx 310 may be allocated one or more resources within an UL resource 304. The UL resource 304 may be adjacent to one or more DL resources 302, 306. For example, the UL resource 304 may be between a first DL resource 302 and a second DL resource 306. A WTRU may determine one or more (e.g., two) frequency gap values 305, 315 for the allocated resource for the UL transmission 310 based on the one or more DL resources 302, 306. For example, a first frequency gap value 305 (e.g., FG(1)) may be the frequency spacing between the first DL resource 302 and the first frequency resource (e.g., first RB) allocated for the UL Tx 310. A second frequency gap value 315 (e.g., FG(2)) may be the frequency spacing between the second DL resource 306 and the last frequency resource (e.g., last RB) allocated for the UL Tx 310.

A frequency gap for the UL Tx 310 may be a minimum value between the first frequency gap value 305 (e.g., FG(1)) and the second frequency gap value 315 (e.g., FG(2)). A frequency gap for an UL frequency resource (e.g., a UL RB) may be referred to as the frequency distance between the closest DL resource and the UL frequency resource. The closest DL resource may be closest to a first RB associated with the UL Tx 310 or closest to a last RB associated with the UL Tx 310. A frequency gap may be indicated as a unit of RBs, subcarriers, or subbands.

The frequency gap may be a frequency spacing between an uplink resource and a reference frequency, for example, where the uplink resource is a resource allocated (e.g., scheduled and/or configured) for a UL transmission. The reference frequency may be one or more of the following: the first, the last, or the center frequency resource (e.g., RB, subcarrier) of a neighboring downlink resource or downlink resource region; the first, the last, or the center frequency resource of the associated bandwidth part; the first, the last, or the center frequency resource of default bandwidth part (e.g., BWP #0); the first, the last, or the center frequency resource of the associated SS/PBCH block; or a frequency resource configured within a BWP.

Frequency gap may be interchangeably used herein with frequency location, FG, frequency gap distance (FGD), frequency distance, frequency spacing, minimum frequency gap, minimum frequency distance, minimum FG, cross-link frequency gap, and cross-link frequency distance.

A WTRU may determine one or more power control parameters for an UL Tx as a function of spatial domain separation between an UL beam configuration (e.g., for the UL Tx) and a DL beam configuration. For example, the WTRU may receive an indication to adjust the one or more power control parameters as a function of the spatial domain separation between the UL beam configuration (e.g., for the UL Tx) and the DL beam configuration. The WTRU may determine UL transmission power (e.g., without considering the spatial domain separation). The WTRU may determine a scaling factor based on the spatial domain separation. The WTRU may scale (e.g., using the scaling factor) the transmission power of the UL Tx based on the scaling factor determined based on the spatial domain separation.

The WTRU may (e.g., be configured to) apply a dynamic UL PC, a dynamic MCS adjustment (e.g., for XDD), and/or a Tx behavior change (e.g., Tx dropping, skipping, stopping, cancelling, deferring or a Tx with modified parameter(s)) based on a spatial-domain separation. For example, if a spatial-domain separation between a first configured, activated, and/or indicated beam(s)/RS(s)/TCI(s) for UL Tx and a second configured, activated, and/or indicated beam(s)/RS(s)/TCI(s) for DL Rx on a same symbol/slot is below a second threshold (e.g.; beam-index wise, or based on a pre-configured rule across multiple beam configuration candidates). The WTRU may be configured to transmit an UL resource over the first RBs using the first beam configuration may identify and/or determine the second beam configuration to compare for assessment of the condition or criteria (e.g., determine whether the spatial-domain separation is below the second threshold).

The second beam configuration may be identified and/or determined based on a mixed (UL/DL) slot/symbol-type configuration and/or indication, e.g., by an enhanced tdd-UL-DL-config, which may comprise the mixed slot/symbol-type. In examples, the WTRU may be informed of the second beam configuration associated with RB(s) being allocated for the DL in the mixed (UL/DL) slot/symbol-type. Such association may be one or more of: the second beam configuration is for the WTRU's desired receiving beam configuration over the RB(s) for the DL in the mixed slot/symbol-type; the second beam configuration is an (e.g., additional) information content (e.g., configured and/or indicated for the assessment of the condition and/or criteria (e.g., determining whether the spatial-domain separation is below the second threshold)), different from a third beam configuration, for example, (e.g., already) configured and/or indicated as a desired beam configuration for DL reception by the WTRU on the RB(s).

The second beam configuration may be (e.g., explicitly) informed, configured, and/or indicated (e.g., by the network, such as from the gNB) to the WTRU (e.g., based on a beam configuration-index wise difference, and/or based on a configured and/or indicated spatial-domain window/range for determining the spatial-domain separation, etc.), e.g., by MAC-CE signaling and/or DCI signaling. In examples, the explicit signaling may include a second WTRU's (e.g., desired) DL reception beam configuration related information and/or a beam quality metric (e.g., RSRP, L1-RSRP, cri-RSRP, ssb-Index-RSRP, L1-SINR, and/or SRS-RSRP, etc.) associated with the second WTRU's beam configuration. In examples, an RS of the second WTRU's beam configuration may be an SRS, and the beam quality metric may be an SRS-RSRP, for example, where the SRS-RSRP may be determined and/or derived (e.g., by the second WTRU) based on measuring the SRS.

The second beam configuration may be (e.g., implicitly) identified and/or determined by the WTRU (e.g., based on a pre-defined/pre-configure rule), e.g., based on a beam configuration-index wise difference, and/or based on a configured and/or indicated spatial-domain window/range (e.g., for determining the spatial-domain separation, etc.). In examples, the pre-defined rule may be that the second beam configuration used to compare for assessment of the conditions and/or criteria (e.g., to determine whether the spatial-domain separation is below the second threshold) is one or more of the (e.g., previously) used and/or applied beam configuration for received, monitored, and/or measured DL RB(s) (e.g., on a mixed slot/symbol-type symbol(s)/slot(s)) at the WTRU. In examples, the one or more of the previously used and/or applied beam configuration may be the most recently used and/or applied beam configuration for received, monitored, and/or measured DL RB(s) (e.g., on a symbol indicated/associated with the mixed slot/symbol-type) at the WTRU. In examples, the one or more of previously used and/or applied beam configuration may be a union of A(≥1) most recently used and/or applied beam(s)/RS(s)/TCI(s) (and/or within a pre-defined/pre-configured time window parameter and/or value).

The second threshold value may be pre-defined, pre-configured, identified, and/or indicated to the WTRU. The second threshold value may be pre-defined, pre-configured, identified, and/or indicated to the WTRU, for example, as a B(≥1) beam(/RS/TCI)-index wise difference (e.g., the beam-indexes may be continuously increasing in accordance with actual spatial domain beam direction changes in a monotonic way, or a gNB may configure and/or indicate a pattern-related info across beam configuration indexes for the WTRU to calculate and/or assess the beam configuration-index wise difference). In examples, if B=2, the condition and/or criteria to apply the dynamic UL PC and/or the dynamic MCS adjustment (e.g., for XDD) or a Tx behavior change (e.g., Tx dropping, skipping, stopping, cancelling, deferring, and/or a Tx with modified parameter(s)) may be met, for example, if the beam configuration-index wise difference between the first beam configuration for UL and the second beam configuration for DL is less than or equal to B=2 beam configuration-index wise difference.

The second threshold value may be pre-defined, pre-configured, identified, and/or indicated to the WTRU, for example, based on a configured and/or indicated spatial-domain window and/or angular-domain range/spread related parameter(s), etc. (e.g., for determining the spatial-domain separation, etc.).

In examples, a multi-level threshold and correspondingly applying a multi-level dynamic UL PC for XDD may be configured for and/or applicable to the WTRU. For example, a first threshold may be associated with applying a first dynamic UL PC operation. A second threshold may be associated with applying a second dynamic UL PC operation. The second threshold may be greater than the first threshold. In examples, two values of the threshold (e.g., the first threshold and the second threshold) may be configured as B1=3 and B2=7. If the beam configuration-index wise difference between the first beam configuration for UL and the second beam configuration (for DL) is less than or equal to the first threshold (e.g., B1=3 beam configuration-index wise difference), the WTRU may apply a first (e.g., level-1) dynamic UL PC operation, e.g., P1 dB UL power reduction. If the beam configuration-index wise difference between the first beam configuration for UL and the second beam configuration (for DL) is between the first threshold (e.g., B1=3) and the second threshold (e.g., B2=7), the WTRU may apply a level-2 dynamic UL PC operation, e.g., P2 (<P1) dB UL power reduction. For example, the beam configuration-index wise difference may be between the first threshold and the second threshold when the beam configuration-index wise difference is greater than the first threshold and less than the second threshold. If the beam configuration-index wise difference between the first beam configuration for UL and the second beam configuration (for DL) is greater than the second B2=7 beam/RS/TC-index wise difference, the WTRU may refrain from applying (e.g., may not apply) a dynamic UL PC operation (e.g., for XDD).

In examples, a multi-level threshold and correspondingly applying a multi-level dynamic (UL) MCS adjustment (for XDD) may be configured and/or applicable to the WTRU. For example, a first threshold may be associated with applying a first dynamic MCS adjustment. A second threshold may be associated with applying a second dynamic MCS adjustment. The second threshold may be greater than the first threshold. In examples, two values of the threshold may be configured to the WTRU as B1=3 and B2=7. If the beam configuration-index wise difference between the first beam configuration for UL and the second beam configuration (for DL) is less than or equal to the first threshold (e.g., B1=3) beam configuration-index wise difference, the WTRU may apply a first (e.g., level-1) dynamic MCS adjustment, e.g., Q1-level MCS down from a scheduled, configured, and/or indicated MCS level for the UL resource. If the beam configuration-index wise difference between the first beam configuration for UL and the second beam configuration (for DL) is between B1=3 and 82=7, the WTRU may apply a level-2 dynamic MCS adjustment, e.g., Q2-level MCS down from a schedule, configured, and/or indicated MCS level for the UL resource. If the beam configuration-index wise difference between the first beam configuration for UL and the second beam configuration (for DL) is larger than B2=7 beam/RS/TC-index wise difference, the WTRU may refrain from applying (e.g., does not apply) dynamic MCS adjustment (e.g., for XDD).

The WTRU may (e.g., be configured to) apply a dynamic UL PC and/or a dynamic MCS adjustment (e.g., for XDD) or a Tx behavior change (e.g., Tx dropping, skipping, stopping, cancelling, and/or deferring or a Tx with modified parameter(s)), for example, if a priority indication for first configured, scheduled, and/or indicated RBs for UL Tx is given. A priority indication may imply that a (e.g., certain level of) priority is given to the UL Tx (e.g., compared to other actions on a second UL and/or DL resource on a (e.g., same) symbol/slot).

In examples, the priority indication may be sent (e.g., given) to the UL Tx. The WTRU may refrain from applying (e.g., may not apply) a dynamic UL PC operation and/or a dynamic MCS adjustment (e.g., for XDD), or a Tx behavior change (e.g., Tx dropping, skipping, stopping, cancelling, and/or deferring or a Tx with modified parameter(s)), for example, if the priority indication is given to the UL Tx. If the priority indication is given to the UL Tx, the WTRU may refrain from applying (e.g., may not apply) a dynamic UL PC operation and/or a dynamic MCS adjustment (e.g., for XDD), or a Tx behavior change (e.g., Tx dropping, skipping, stopping, cancelling, and/or deferring or a Tx with modified parameter(s)), e.g., regardless of other condition(s) and/or criteria being met or not. The WTRU may apply the dynamic UL PC operation and/or the dynamic MCS adjustment (e.g., for XDD) with a different level of power reduction and/or a different level of MCS adjustment, for example, if the priority indication is given (e.g., to the UL Tx).

In examples, if the priority indication is not given, the WTRU may apply an X (dB) UL power reduction, for example, based on applying the dynamic UL PC operation (e.g., for XDD). If the priority indication is given, the WTRU may apply an f(X) (dB) UL power reduction, for example, based on applying the dynamic UL PC operation (e.g., for XDD), where f(X) may be a calculated value (e.g., based on a pre-defined, pre-configured, and/or indicated function f(•) of the value X). In examples, f(X) may be a lowered value from X. A lowered power reduction value of f(X) (e.g., as compared to X) may be applied (e.g., based on the priority indication given), for example, instead of applying X-dB UL power reduction. In examples, f(X) may be an increased value from X. A power boosting by f(X) may be applied based on the given priority indication (e.g., if an (e.g., extremely) high-priority is indicated for the UL TX, e.g., a (e.g., special extreme) type of URLLC packet, etc.), for example, instead of applying an X-dB UL power reduction.

In examples, if the priority indication is not given, the WTRU may apply a Y-level MCS adjustment, for example, based on applying the dynamic MCS adjustment (e.g., for XDD). If the priority indication is given, the WTRU may apply a g(Y)-level MCS adjustment, for example, based on applying the dynamic MCS adjustment (e.g., for XDD), where g(Y) may be a calculated value based on a pre-defined, pre-configured, and/or indicated function g(•) of the value Y. In examples, g(Y) may be a lowered value from Y. A lowered MCS reduction value of g(Y) (e.g., as compared to Y) may be applied based on the priority indication given, for example, instead of applying the Y-level MCS down/reduction. In examples, g(Y) may be an increased value from Y. A higher MCS by g(Y) may be applied based on the given priority indication (e.g., if an (e.g., extremely) high-priority is indicated for the UL TX, e.g., a (e.g., URLLC) packet requiring high data rate to be successfully delivered with lower latency, so that higher MCS may be desired based on an efficient network implementation with interference management around the UL TX), for example, instead of applying the Y-level MCS down/reduction.

Priority rule(s) (e.g., as described herein among the above conditions and/or criteria) may be pre-defined, configured, or indicated, e.g., on which condition(s) may be applied as higher-priority than others. In examples, the condition of whether a priority indication for a first configured, scheduled, and/or indicated RBs for UL Tx is given may have the highest priority. If the condition of whether a priority indication for a first configured, scheduled, and/or indicated RBs for UL Tx is given is met, no UL power reduction and/or MCS adjustment may be applied, for example, regardless of other condition(s) being met or not.

In examples, the condition of whether a frequency gap between a first configured, scheduled, and/or indicated RBs for UL Tx and a second configured, scheduled, and/or indicated RBs (e.g., for DL Rx) on a same symbol/slot is below a first threshold may have the second highest priority. For example, if the condition of whether a priority indication for a first configured, scheduled, and/or indicated RBs for UL Tx is given is not met, then the condition of whether the frequency gap is below the first threshold may be checked next. For example, if the frequency gap between the first RBs for UL and the second RBs for DL is larger than Y2 RBs, the WTRU may refrain from applying (e.g., does not apply) a dynamic UL PC operation for XDD (e.g., regardless of checking the condition of whether a spatial-domain separation between a first configured, activated, and/or indicated beam(s)/RS(s)/TCI(s) for UL Tx and a second configured, activated, and/or indicated beam(s)/RS(s)/TCI(s) (e.g., for DL Rx) on a same symbol/slot is below a second threshold, and so on).

Figure 4A:
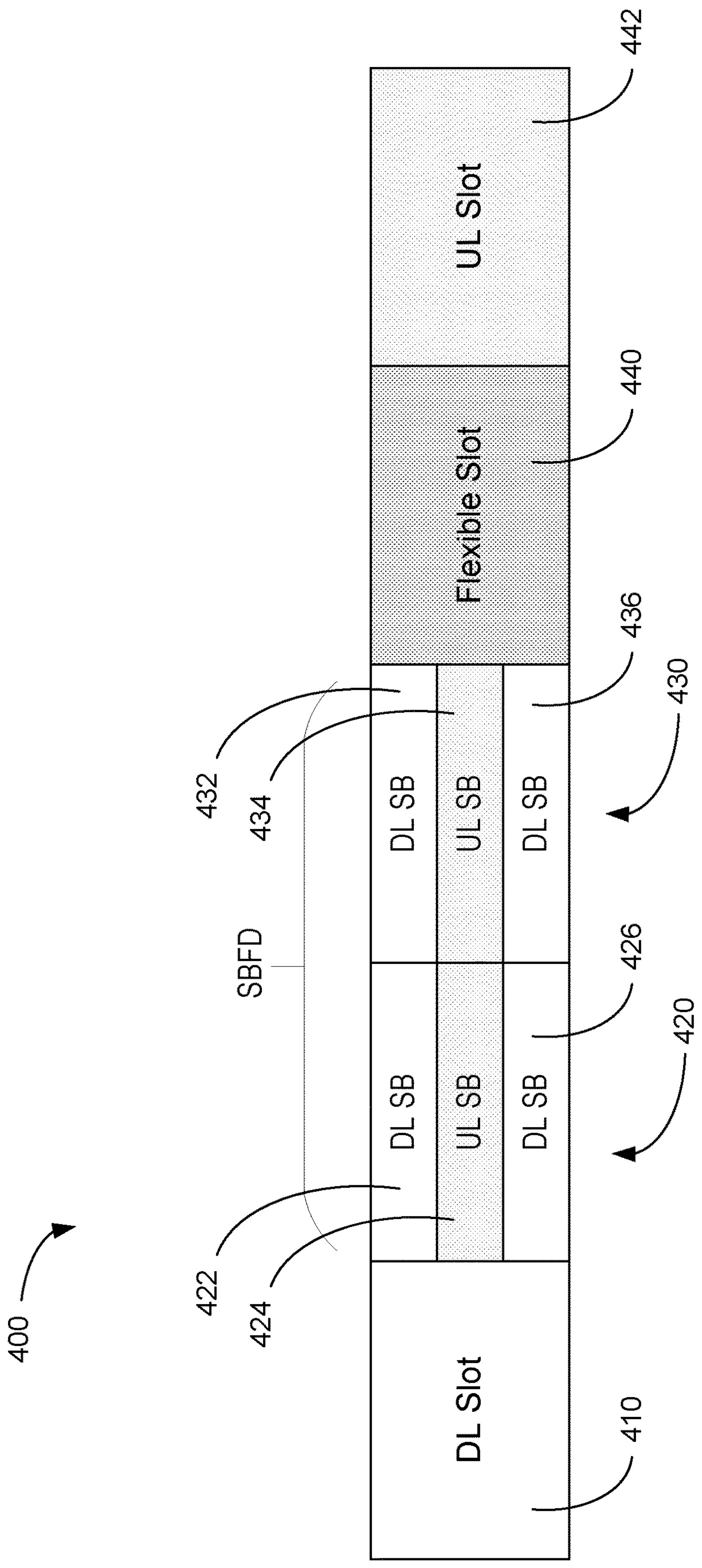
FIG. 4A illustrates an example Subband non-overlapping full duplex (SBFD).

Subband non-overlapping full duplex (SBFD) operations may be performed based on one or more Tx parameter adjustments. In examples, New Radio (NR) duplex operation (e.g., NR-Duplex, XDD, etc.) may improve conventional TDD operation by enhancing UL coverage, improving capacity, reducing latency, and so forth. The conventional TDD operation may be based on splitting the time domain between the uplink and downlink. Feasibility of allowing full duplex, or more specifically, SBFD (e.g., at the gNB) within a conventional TDD band may be considered for investigation, (e.g., as illustrated in FIG. 4A), where an illustrated SBFD slot, comprising a frequency resource allocation based on a combination of DL SB(s) and UL SB(s), may be an example of the known, identified, and/or determined based on a mixed(UL/DL) slot/symbol-type configuration/indication, e.g., by an enhanced tdd-UL-DL-config comprising the mixed slot/symbol-type, etc., described in this disclosure. In examples, a mixed (UL/DL) slot/symbol-type may indicate a slot/symbol that can be used for both DL and UL, each being allocated with (non-overlapping) independent RB(s) on the slot/symbol, e.g., for XDD/SBFD (e.g., at a gNB side). A gNB may schedule UL and DL resources to WTRUs within the UL and DL non-overlapping subbands, respectively.

FIG. 4A depicts an example SBFD slot format 400. The example SFBD slot format 400 may comprise a plurality of slots. For example, the example SFBD slot format 400 may comprise a DL slot 410, one or more mixed slots 420, 430, a flexible slot 440, and an UL slot 442. The DL slot 410 may be reserved for downlink transmissions. The mixed slots 420, 430 may be divided into subbands to accommodate both UL and DL transmissions in the same slot. Each of the mixed slots 420, 430 may be divided into multiple segments of consecutive symbols. Each segment of consecutive symbols may be used for a DL subband, an UL subband, or a flexible subband. A DL subband may be reserved for a DL transmission. An UL subband may be reserved for an UL subband. A flexible subband may be used for a DL transmission or an UL transmission.

Mixed slot 420 may comprise one or more DL subbands (e.g., such as DL subband 422 and DL subband 426) and one or more UL subbands (e.g., such as UL subband 424). Mixed slot 430 may comprise one or more DL subbands (e.g., such as DL subband 432 and DL subband 436) and one or more UL subbands (e.g., such as UL subband 434). Operations based on the SBFD slot may reduce implementation complexity in FD at least at the gNB. A WTRU may be configured and/or scheduled to transmit an UL signal (e.g., PUSCH, PUCCH, SRS) over a first set of RBs (e.g., UL SB), which may be adjacent to a second set of RBs (e.g., DL SB) for DL reception by a second WTRU (e.g., that may be nearby the WTRU). The UL signal transmitted by the WTRU may cause a WTRU-to-WTRU cross-link (e.g., leakage) interference (e.g., such as CLI or CLLI) on the adjacent second set of RBs for the second WTRU's DL reception. One or more solutions discussed herein may be used to reduce dynamic CLI leakage in adjacent DL/UL sub-bands when the gNB uses FD operation.

Figure 4B:
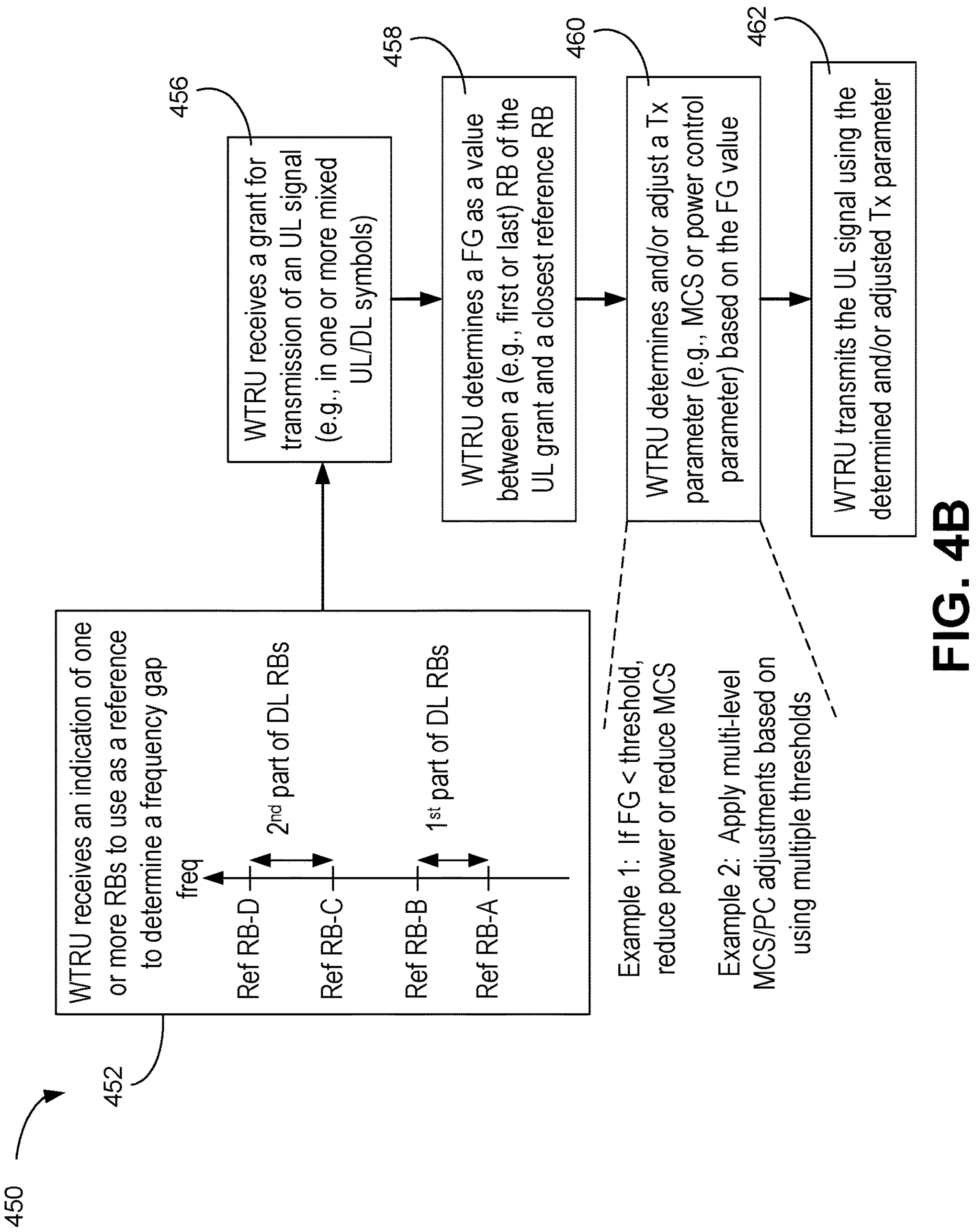
FIG. 4B illustrates example SBFD operations based on transmit parameter adjustment(s).

FIG. 4B depicts example SBFD operations 450 based on Tx parameter adjustment(s). As shown in FIG. 4B, in an example, a WTRU may receive, at 452, an indication of one or more RBs to use as a reference (e.g., one or more reference RBs) to determine a FG. The one or more reference RBs may be the highest and/or lowest RBs in a first part of DL RBs and a second part of DL RBs. For example, the first part of DL RBs may range from Ref RB-A to Ref RB-B, and the second part of DL RBs may range from Ref RB-C to Ref RB-D. In examples, the second part of DL RBs may be an example of the second RBs to compare for assessment of the condition and/or criteria, discussed herein, where the example may also be based on FIG. 3. The indication may be received via RRC, MAC-CE, and/or DCI. In an example, RRC may configure a set (e.g., for the one or more RBs) and a MAC-CE and/or a DCI may indicate one of the set.

At 456, the WTRU may receive a grant associated with transmission of an UL signal. For example, the grant may indicate one or more (e.g., a set of) RBs for transmission of an UL signal (e.g., in at least one mixed UL/DL symbol). The WTRU may determine, at 458, an FG as a value between a (e.g., first or last) RB of the UL grant and the closest reference RB (e.g., Ref RB-A, Ref RB-B, Ref RB-C, or Ref RB-D), for example, in response to receiving the grant. At 460, the WTRU may determine and/or adjust a Tx parameter (e.g., MCS, link adaptation (LA), and/or power control (PC) parameter) based on the determined FG value. If the FG value is less than a pre-defined or pre-configured threshold, the WTRU may reduce a transmit power and/or reduce an MCS value/level for transmission of the UL signal scheduled by the grant. The WTRU may apply multi-level MCS/PC/LA adjustments based on multiple thresholds (e.g., if multiple thresholds are configured). For example, the WTRU may apply a first adjustment when the FG value is less than a first threshold and the WTRU may apply a second adjustment when the FG value is less than the first threshold and a second threshold. At 462, the WTRU may transmit the UL signal using the determined or adjusted Tx parameter(s), e.g., MCS, LA, and/or PC parameter(s).

A WTRU may be configured to determine a frequency gap associated with an UL signal based on one or more parts of DL RBs. For example, the UL signal may be between two parts of DL RBs. The WTRU may determine which part of DL RBs that the UL signal is closer to. The WTRU may identify one or more reference RBs in each of the parts of DL RBs. The one or more reference RBs may be the first and/or last RBs in the respective part of DL RBs.

Figure 4C:
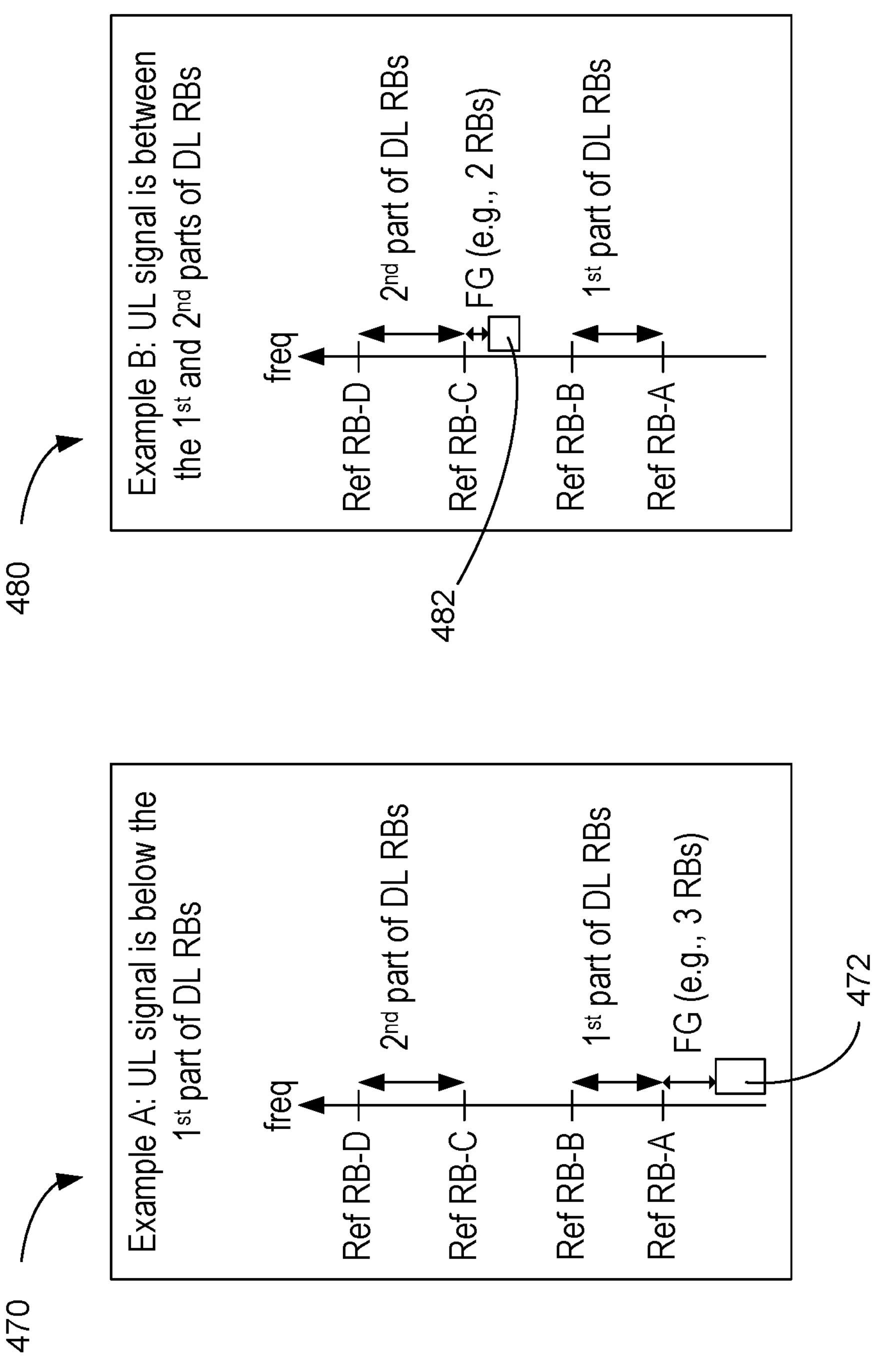
FIG. 4C illustrates example frequency gap value determinations.

FIG. 4C depicts example FG value determinations 470, 480. In a first example FG value determination 470, an UL signal 472 may be scheduled on a set of scheduled RBs which are below a first part of DL RBs. For example, the set of RBs scheduled for the UL signal 472 may be indicated via a grant received by the WTRU. The first part of DL RBs may comprise a first reference RB (e.g., Ref RB-A) and a second reference RB (e.g., Ref RB-B). The first reference RB and the second reference RB may be the first and last RB, respectively, in the first part of DL RBs. The WTRU may determine that the FG (e.g., between the UL signal 472 and the first part of DL RBs) is three RBs which is a RB-level distance between the highest UL RB of the set of scheduled RBs allocated to the UL signal 472 and the Ref RB-A.

In a second example FG value determination 480, an UL signal 482 may be scheduled on a set of scheduled RBs which are between the first part of DL RBs and a second part of DL RBs. For example, the set of RBs scheduled for the UL signal 482 may be indicated via a grant received by the WTRU. The second part of DL RBs may comprise a first reference RB (e.g., Ref RB-C) and a second reference RB (e.g., Ref RB-D). The first reference RB and the second reference RB may be the first and last RB, respectively, in the second part of DL RBs. The UL signal 482 may be closer to the second part of DL RBs than to the first part of DL RBs. The WTRU may determine that the FG is two RBs which is a RB-level distance between the highest UL RB of the set of scheduled RBs and the Ref RB-C. The UL signal 482 may be three or more RBs from the first part of DL RBs.

As described herein, a WTRU may (be configured to) receive an uplink grant that indicates a set of resource blocks (RBs) for UL transmission sent over one or more symbols (e.g., at least one of the one or more symbols being a mixed UL/DL symbol in a BWP).

The WTRU may determine a value of an FG between a first RB from the set of RBs for UL transmission and a second RB from among one or more reference RBs (e.g., in response to receiving the uplink grant). The WTRU may determine one or more transmission parameters (e.g., MCS, transmit power, and/or link adaptation parameter) based on the determined FG value. The WTRU may transmit the UL transmission using the determined transmission parameter(s).

In examples, the first RB may be the lowest or highest RB of the set of RBs for UL transmission and the second RB may be a closest RB of the one or more reference RBs to the first RB (and the FG value may be determined as a delta (e.g., a difference, a RB-level distance/difference, etc.) between them).

In examples, the second RB from among the one or more reference RBs may be an RB used for (or configured for) DL transmission in one or more of symbols. The WTRU may further (be configured to) receive an explicit identification of the one or more reference RBs (e.g., via RRC, MAC CE, and/or DCI).

Dynamic UL PC may be performed (e.g., for XDD). A WTRU may determine a transmission power (P) for a UL transmission based on one or more power control parameters, wherein the power control parameters include one or more of following but not limited to: maximum transmission power ($P_{CMAX}$); nominal transmission power (Po); pathloss (PL), e.g., measured from pathloss RS; a scaling factor (a) for PL; or a closed loop power control parameter for slot or symbol i (f(i)). A WTRU may determine a transmission power for a PUSCH transmission, PUCCH transmission, and SRS transmission in Eq. (1), Eq. (2), and Eq. (3), respectively.

$$P_{PUSCH,b,f,c}(i, j, q_d, l) = \min\begin{cases} P_{CMAX,f,c}(i), \\ P_{O\_PUSCH,b,f,c}(j) + 10\log_{10}\left(2^{\mu}\cdot M_{RB,b,f,c}^{PUSCH}(i)\right) + \alpha_{b,f,c}(j)\cdot PL_{b,f,c}(q_d) + \\ \Delta_{TF,b,fc}(i) + f_{b,f,c}(i, l) \end{cases} \text{[dBm]} \tag{1}$$

$$P_{PUCCH,b,f,c}(i, q_u, q_d, l) = \min\begin{cases} P_{CMAX,f,c}(i), \\ P_{O\_PUSCH,b,f,c}(q_u) + 10\log_{10}\left(2^{\mu}\cdot M_{RB,b,f,c}^{PUCCH}(i)\right) PL_{b,f,c}(q_d) + \\ \Delta_{F\_PUCCH}(F) + \Delta_{TF,b,fc}(i) + g_{b,f,c}(i, l) \end{cases} \text{[dBm]} \tag{2}$$

-continued $$P_{SRS,b,f,c}(i, q_s, l) = \min\begin{Bmatrix} P_{CMAX,f,c}(i), \\ P_{O_{SRS,b,f,c}}(q_s) + 10\log_{10}(2^{\mu} \cdot M_{SRS,b,f,c}(i)) + \\ \alpha_{SRS,b,f,c}(q_s) \cdot PL_{b,f,c}(q_d) + h_{b,f,c}(i, l) \end{Bmatrix} \tag{3}$$

[dBm]

In examples, transmission power for a UL transmission may be determined, e.g., based on a frequency gap (FG) value. A WTRU may determine a first transmission power for an UL transmission, for example, if the FG value for the UL transmission is equal to or less than a threshold. The WTRU may determine a second transmission power for the UL transmission, for example, if the FG value for the UL transmission is greater than the threshold. One or more of following may apply: the WTRU may determine one or more power control parameters as a function of the FG value; the WTRU may determine one or more power control parameters as a function of the FG value and the presence of DL transmission in the DL resource (e.g., which may be used for the FG value determination); or the WTRU may determine one or more power control parameters as a function of the FG value, for example, if the WTRU is indicated to do so.

A WTRU may determine one or more power control parameters as a function of a FG value. In examples, a first PCMAX value and/or f(i) value may be used, for example, if the FG value for the UL transmission is equal to or less than a threshold. A second $P_{CMAX}$ value and/or f(i) value may be used, for example, if the FG value for the UL transmission is greater than the threshold, e.g., where the threshold may be configured via a (e.g., higher layer) signaling (e.g., RRC signaling and/or MAC-CE signaling) and/or indicated by a dynamic signaling (e.g., MAC-CE signaling and/or DCI signaling). The first PCMAX value may be determined based on power class supported by the WTRU and the second PCMAX value may be configured via a signaling (e.g., higher layer signaling and/or a dynamic signaling), or vice-versa. The first f(i) value may be an (e.g., absolute) value configured via a signaling (e.g., higher layer signaling and/or a dynamic signaling) and the second f(i) value may be accumulated via a TPC command, or vice-versa.

In examples, a WTRU may determine a set of power control parameters based on the FG value. For example, a subset of (e.g., configured and/or indicated) power control parameters may be used if the FG value is larger than a threshold and a second subset (e.g., full set) of the (e.g., configured and/or indicated) power control parameters may be used if FG value is equal to or less than the threshold, or vice-versa. A power offset parameter (e.g., Poffset) may be part of the power control parameters, for example, if the FG value is equal to or less than the threshold, e.g., wherein the power offset value may be determined based on the FG value.

In examples, a WTRU may determine a set of power control parameters based on the FG value. For example, a first set of power control parameters may be used to determine the Tx power if the FG value is larger than a threshold. A second set of power control parameters may be used to determine the Tx power, for example, if the FG value is equal to or less than threshold.

A WTRU may determine one or more power control parameters as a function of the FG value and the presence of DL transmission in the DL resource (e.g., which may be used for the FG value determination). For example, if no DL signal transmission is detected in the DL resource which may be used for the FG value determination, a WTRU may determine the transmission power without the FG value. Otherwise, the WTRU may determine the transmission power based on the FG value. The presence of a DL signal transmission in a DL resource region may be indicated or informed to the WTRU. For example, if a WTRU is scheduled for a UL transmission, the WTRU may be indicated pertaining to the presence of a DL signal transmission in the DL resource region.

A WTRU may determine one or more power control parameters as a function of the FG value, for example, if the WTRU is indicated to do so. For example, a scheduling DCI for a UL transmission (e.g., PUSCH transmission, SRS transmission) may include an indication to determine whether transmission power is adjusted (e.g., based on the FG value or not).

In examples, UL transmission power of a UL frequency resource may be determined (e.g., based on the FG value). For example, a UL transmission may include one or more frequency resources within a slot and each frequency resource (e.g., RB) may have its associated (e.g., a respective) FG value. A WTRU may (e.g., first) determine UL transmission power (e.g., without considering FG value) and the WTRU may scale (e.g., using a scaling factor) the transmission power of each frequency resource based on its associated FG value. The scaling factor for a frequency resource may be determined, for example, as a function of its associated FG value. The scaling factor may be '1' for a frequency resource, for example, which may have its associated FG value greater than a threshold. The scaling factor may be less than '1' for a frequency resource, for example, which may have its associated FG value less than the threshold.

In examples, if one or more of the above conditions and/or criteria as described herein (e.g., based on the frequency gap, the spatial-domain separation, and/or the priority indication, etc.) is/are met, the WTRU may (e.g., be configured and/or indicated to) apply one or more of the following dynamic UL PC operations (e.g., for XDD operations): a dynamic UL PC adjustment; multiple UL PC loops for XDD; or an enhanced power headroom report (PHR).

The WTRU may apply a dynamic UL PC adjustment. The dynamic UL PC adjustment may be a direct UL PC adjustment on UL PC equation/formula, e.g., a power-reduction coefficient/parameter may be added to an existing PC term (e.g., an open-loop PC parameter) of one or more among PO (e.g., as nominal power), pathloss term (e.g., based on a PL RS), alpha (e.g., as a ratio parameter on PL), etc. The dynamic UL PC adjustment may involve applying an additional offset on a current UL PC calculation. Applying an additional offset on a current UL PC calculation may include, for example, introducing an extra power reduction term in a UL PC equation, directly reducing a $P_{MAX}$ (e.g., in relation to applying P-MPR), where $P_{MAX}$ (e.g., $P_{CMAX}$) is a maximum (e.g., allowable) transmission power for the WTRU, and/or an explicit power reduction offset parameter may be applied after a UL PC calculation is done.

The WTRU may apply multiple UL PC loops for XDD. One or more of the following UL PC loops may be configured for the WTRU to maintain/apply/update: a UL PC loop (e.g., I=0) for non-XDD slot/symbol (e.g., which can be the same as legacy (e.g., can share a legacy CLPC)); a UL PC loop (e.g., I=1) for an XDD slot/symbol with a first set/combination of condition(s) (e.g., being met), a UL PC loop (e.g., I=2) for an XDD slot/symbol with a second set/ combination of condition(s) (e.g., being met), a UL PC loop (e.g., I=3) for an XDD slot/symbol, with a third set/combination of condition(s) (e.g., being met), etc.

In examples, a UL PC loop may correspond to (e.g., be associated with) a separated closed-loop PC parameter (e.g., a different value of I in a UL PC equation/formula)

In examples, the first set of condition(s) may involve the determination that the distance between the UL subband and DL subband is short (<RBs), e.g., as in the above condition and/or criteria when a frequency gap is below a first threshold (e.g., as described herein). In examples, the second set of condition(s) may involve the determination that the distance between the UL subband and DL subband is large (≥RBs) and a spatial-domain separation between a first beam configuration for the UL subband and a second beam configuration for the DL subband is below a threshold, as in the above conditions (e.g., as described herein)

The WTRU may determine an enhanced power headroom report (PHR). Power headroom (PH) may be calculated, derived, estimated, or determined per (e.g., XDD) slot/symbol-type and/or one or more condition and/or criteria (e.g., as described herein), e.g., for PH type0, PH type1, PH type2, etc. PH type0 may be the same as legacy PH, e.g., calculated based on $P_{MAX}-P_{PUSCH}$ without taking any possible XDD operations. PH type1 may be calculated for a XDD slot (e.g., and when the first set/combination of condition(s) is met, e.g., based on $P_{MAX}-P_{PUSCH1}$ (e.g., where $P_{PUSCH1}$ may include one or more power-reduction parameter/term) or based on $P_{MAX}-P_{PUSCH}-P_{offsetXDD1}$. In examples, the WTRU may (e.g., be configured and/or indicated to) report (e.g., only) a different information content/value (e.g., a value based on $P_{offsetXDD1}$) compared with $PH_{type0}$. PH type2 may be calculated for a XDD slot and when the second set/combination of condition(s) is met, e.g., based on $P_{MAX}-P_{PUSCH2}$ (e.g., where $P_{PUSCH2}$ may include one or more power-reduction parameter/term) or based on $P_{MAX}-P_{PUSCH}-P_{offsetXDD2}$. In examples, the WTRU may (e.g., be configured and/or indicated to) report (e.g., only) a different information content/value (e.g., a value based on $P_{offsetXDD2}$) compared with $PH_{type0}$.

One or more PHR types may be used, for example, where each PHR type may be associated with a PH type. For example, a first PHR type may correspond to a reporting of a first PH type; a second PHR type may correspond to a reporting of a second PH type; and so on. A WTRU may trigger a PHR, for example, based on one or more PHR-conditions. The one or more PHR-conditions may be determined, for example, based on the PHR type. A first set of PHR-conditions may be configured, used, or determined for a first PHR type and a second set of PHR-conditions may be configured, used, or determined for a second PHR type. A set of PHR-conditions may include one or more of the following: a periodicity (e.g., expiry of a timer), a threshold of the PL gap (e.g., PL value change since the last time a PHR was transmitted), a threshold of the power backoff, or a threshold of P-MPR. A (e.g., each) PHR-condition/parameter may be (e.g., independently) configured or determined for a set of PHR-conditions. A set of PHR-conditions may be (e.g., commonly) used, for example, irrespective of the PHR type. One or more PHR-conditions/parameters may be configured (e.g., independently) for a PHR type.

A WTRU may be indicated to report a set of PHR types, e.g., if a triggering condition is met for one or more of the PHR type within the set of PHR types. A WTRU may trigger PHR for the first and second PHR types (e.g., even if the second PHR type does not meet a triggering condition), for example, if the set of PHR types includes a first PHR type and a second PHR type and a triggering condition for the first PHR type is met. The set may be configured via a (e.g., higher layer) signaling (e.g., via RRC signaling). The set may be determined based on XDD-related configuration information (e.g., tdd-UL-DL-config-Common/Dedicated for XDD, non-XDD slot/symbol-type, XDD slot/symbol-type (e.g., including mixed UL/DL slot/symbol-type), the above condition(s) as described herein, such as for the frequency gap, and/or for the spatial-domain separation, etc.). The set of PHR types may (e.g., automatically) include the first PHR type (e.g., PH type 0 for legacy) by default, for example, if a triggering condition for the second or third PHR type is met. A WTRU may trigger a set of PHR types, for example, based on a dynamic indication. For example, a network (e.g., gNB) may indicate (e.g., via DCI) to report one or more PHR types, where the indication may include which PHR types to report and its associated uplink resource information for the triggered PHR.

Dynamic MCS adjustment may be performed (e.g., for XDD). Table 2 illustrates an example MCS index table for DL, for example, which may be shared/reused for UL cases (e.g., and may be limited in certain case(s) for UL, e.g., PUSCH with transform precoding).

TABLE 2

Example MCS index table for DL

| MCS Index $I_{MCS}$ | Modulation Order $Q_m$ | Target code Rate R × [1024] | Spectral efficiency |
|---|---|---|---|
| 0 | 2 | 120 | 0.2344 |
| 1 | 2 | 157 | 0.3066 |
| 2 | 2 | 193 | 0.3770 |
| 3 | 2 | 251 | 0.4902 |
| 4 | 2 | 308 | 0.6016 |
| 5 | 2 | 379 | 0.7402 |
| 6 | 2 | 449 | 0.8770 |
| 7 | 2 | 526 | 1.0273 |
| 8 | 2 | 602 | 1.1758 |
| 9 | 2 | 679 | 1.3262 |
| 10 | 4 | 340 | 1.3281 |
| 11 | 4 | 378 | 1.4766 |
| 27 | 6 | 910 | 5.3320 |
| 28 | 6 | 948 | 5.5547 |
| 29 | 2 | reserved | |
| 30 | 4 | reserved | |
| 31 | 6 | reserved | |

In examples, if one or more of the above conditions and/or criteria (e.g., as described herein relating to the frequency gap, the spatial-domain separation, the priority indication, etc.) is/are met, the WTRU may (e.g., be configured and/or indicated to) apply one or more of the following dynamic MCS adjustment methods (e.g., for XDD operations). Such MCS adjustment may be applicable to at least a PDSCH transmission scheduled dynamically or semi-persistently, or to a PUSCH transmission scheduled dynamically or by configured grant, or a repetition thereof.

General behavior for dynamic MCS adjustment may be performed. If the one or more of the above conditions and/or criteria are met, the WTRU may apply a second MCS (e.g., instead of applying a first MCS schedule, configured, and/or indicated for the UL (or DL) resource), for example, where the second MCS may have a J-level MCS difference compared to the first MCS. Information related to J may be pre-configured, pre-determined, and/or indicated (e.g., from a network/gNB) to the WTRU. In examples, the first MCS may be an MCS index (IMCS) of 7 (e.g., modulation order Qm=2 with spectral efficiency of 1.0273). The WTRU may be configured and/or indicated with J=2. The WTRU may apply the second MCS as being an MCS index (IMCS) of 5 (=7−J) for transmitting the UL resource or for receiving the DL resource, for example, in response to determining that the one or more of the above conditions and/or criteria is/are met (e.g., as described herein). The WTRU may apply the second MCS being set to the lowest possible MCS index of the MCS index table, for example, if the second MCS becomes out-of-range (e.g., below the lowest index of an MCS index table).

Multi-level dynamic MCS adjustment may be performed. The WTRU may be configured with a plurality of values and/or parameters of J. In examples, the WTRU may be configured with J1, J2, etc. (e.g., as multiple candidate MCS adjustment values/parameters), for example, to apply multi-level dynamic MCS adjustment. In examples, J1 may be 2, J2 may be 4, and so on. If the one or more of the above conditions and/or criteria is/are met (e.g., as described herein), the WTRU may apply a second MCS, or a third MCS, etc. (e.g., instead of applying a first MCS schedule, configured, and/or indicated for the UL or DL resource), for example, where the second MCS may have a J1-level MCS difference compared to the first MCS, and the third MCS may have a J2-level MCS difference compared to the first MCS, and so on.

In examples, the first MCS may be an MCS index (IMCS) of 7 (e.g., modulation order Qm=2 with spectral efficiency of 1.0273). The WTRU may apply the second MCS as being an MCS index (IMCS) of 5 (=7−J1, as J1=2) (e.g., for transmitting the UL resource or for receiving the DL resource, for example, in response to determining that the one or more of the above conditions and/or criteria is/are met as satisfying a first set of conditions and/or criteria based on first threshold(s).

In examples, the first MCS may be an MCS index (IMCS) of 7 (e.g., modulation order Qm=2 with spectral efficiency of 1.0273). The WTRU may apply the third MCS as being an MCS index (IMCS) of 3 (=7−J2, as J2=4) for transmitting the UL resource or for receiving the DL resource, for example, in response to determining that the one or more of the above conditions and/or criteria is/are met as satisfying a second set of conditions and/or criteria based on second threshold(s).

The first set of conditions and/or criteria and the second set of conditions and/or criteria may be based on one or more of following: an indicated MCS(s), indicated/determined SRS resource indicators (SRIs) or TCI state(s), a priority indicator, a UL/SUL indicator, a BWP/carrier indicator, a resource allocation type, an open-loop power control parameter set, a PDSCH/PUSCH mapping type, or the like.

The first set of conditions and/or criteria and the second set of conditions and/or criteria may be based on an indicated MCS(s). For example, if indicated MCS(s) are lower than (or equal to) a threshold, the WTRU may apply the second MCS. If the indicated MCS(s) are higher than the threshold, the WTRU may apply the third MCS.

The first set of conditions and/or criteria and the second set of conditions and/or criteria may be based on indicated/determined SRS resource indicators (SRIs) or TCI state(s). The WTRU may receive an association (e.g., association information) between SRIs/TCI states and MCS adjustment values (e.g., J1, J2, etc.), for example, via one or more of MAC CE signaling or RRC signaling. For example, a first SRI/TCI state may be associated with a first MCS adjustment value (e.g., J1) and a second SRI/TCI state may be associated with a second MCS adjustment value (e.g., J2). The WTRU may determine the second MCS or the third MCS, for example, based on the association. The WTRU may determine to use the second MCS based on J1, for example, if the WTRU receives an indication of the first SRI/TCI state or determines the first SRI/TCI state for PDSCH/PUSCH. The WTRU may determine to use the third MCS based on J2, for example, if the WTRU receives an indication of the second SRI/TCI state or determines the second SRI/TCI state for PDSCH/PUSCH, The first set of conditions and/or criteria and the second set of conditions and/or criteria may be based on a priority indicator. The WTRU may receive an association (e.g., association information) between priorities and MCS adjustment values (e.g., J1, J2, etc.), for example, via one or more of MAC CE signaling or RRC signaling. For example, the WTRU may receive a first MCS adjustment value (e.g., J1) for lower priority and a second MCS adjustment value (e.g., J2) for higher priority.

The first set of conditions and/or criteria and the second set of conditions and/or criteria may be based on a UL/SUL indicator. The WTRU may receive association between UL/SUL and MCS adjustment values (e.g., J1, J2, etc.), for example, via one or more of MAC CE signaling or RRC signaling. For example, the WTRU may receive a first MCS adjustment value (e.g., J1) for (e.g., non-supplementary) UL and a second MCS adjustment value (e.g., J2) for supplementary UL (SUL).

The first set of conditions and/or criteria and the second set of conditions and/or criteria may be based on a BWP/carrier indicator. The WTRU may receive an association (e.g., association information) between BWPs/cells and MCS adjustment values (e.g., J1, J2, etc.), for example, via one or more of MAC CE signaling or RRC signaling. For example, the WTRU may receive a first MCS adjustment value (e.g., J1) for a first BWP/cell and a second MCS adjustment value (e.g., J2) for a second BWP/cell.

The first set of conditions and/or criteria and the second set of conditions and/or criteria may be based on a resource allocation type (e.g., resource allocation type 0 and 1). The WTRU may receive association between resource allocation types and MCS adjustment values (e.g., J1, J2, etc.), for example, via one or more of MAC CE signaling and RRC signaling. For example, the WTRU may receive a first MCS adjustment value (e.g., J1) for a first resource allocation type and a second MCS adjustment value (e.g., J2) for a second resource allocation type.

The first set of conditions and/or criteria and the second set of conditions and/or criteria may be based on an open-loop power control parameter set. The WTRU may receive association between open-loop power control parameter sets and MCS adjustment values (e.g., J1, J2, etc.), for example, via one or more of MAC CE signaling or RRC signaling. For example, the WTRU may receive a first MCS adjustment value (e.g., J1) for a first open-loop power control parameter set and a second MCS adjustment value (e.g., J2) for a second open-loop power control parameter set.

The first set of conditions and/or criteria and the second set of conditions and/or criteria may be based on a PDSCH/PUSCH mapping type. The WTRU may receive an association (e.g., association information) between PDSCH/PUSCH mapping types and MCS adjustment values (e.g., J1, J2, etc.), for example, via one or more of MAC CE signaling or RRC signaling. For example, the WTRU may receive a first MCS adjustment value (e.g., J1) for a first PDSCH/PUSCH mapping type (e.g., PDSCH/PUSCH mapping type A) and a second MCS adjustment value (e.g., J2) for a second PDSCH/PUSCH mapping type (e.g., PDSCH/PUSCH mapping type B).

Joint UL PC and MCS adjustment behavior may be performed. The WTRU may (e.g., be configured and/or indicated/switched to) apply one or more of the following (e.g., joint UL PC and MCS adjustment) behaviors, e.g., each being defined/configured as a separate mode of operations: mode 1, mode 2, or mode 3. In examples, mode 1 may include (e.g., only) UL Tx power adjustment (e.g., based on one or more of above dynamic UL PC methods) without any MCS adjustment.

In examples, mode 2 may include (e.g., one-level) WTRU-initiated MCS adjustment, for example, based on a certain condition (e.g., depending on which dynamic UL PC reduction is applied). A threshold value M (e.g., in dB) for the WTRU-initiated MCS adjustment can be pre-defined, configured, or indicated to the WTRU. The WTRU may apply a pre-defined, pre-configured, and/or indicated dynamic MCS adjustment/reduction (e.g., Y-level MCS down from the schedule, configured, and/or indicated MCS level for the UL resource) and transmit the UL resource with applying the MCS reduction, for example, if an X dB dynamic UL PC reduction (e.g., where $X \geq M$) is applied for transmission of a UL resource (e.g., based on one or more of above dynamic UL PC methods). In examples, if $Y=1$, the schedule, configured, and/or indicated MCS index for the UL resource may be adjusted to be the schedule, configured, and/or indicated MCS index$-Y(=1)$. The WTRU may apply the adjusted MCS index to be the lowest MCS index, for example, if the schedule, configured, and/or indicated MCS index$-Y(=1)$ becomes out-of-range (e.g., below the lowest index.

In examples, mode 3 may include multi-level WTRU-initiated MCS adjustment, for example, based on a certain set of condition(s) (e.g., depending on which dynamic UL PC reduction is applied). One or more threshold value (e.g., M1, M2, . . . in dB) for the multi-level WTRU-initiated MCS adjustment can be pre-defined, configured, or indicated to the WTRU. The WTRU may determine whether the calculated X dB belongs to which interval of the multi-level MCS adjustment, for example, if an X dB dynamic UL PC reduction is applied for transmission of a UL resource (e.g., based on one or more of above dynamic UL PC methods). In examples, if $X>M1$, X may belong to a first interval for the multi-level MCS adjustment. The WTRU (e.g., if $X>M1$) may apply a Y1-level MCS down from the schedule, configured, and/or indicated MCS level for the UL resource, e.g., the adjusted MCS index may be the schedule, configured, and/or indicated MCS index$-Y1$. In examples, if $M2<X \leq M1$, X may belong to a second interval for the multi-level MCS adjustment. The WTRU (e.g., if $M2<X \leq M1$) may apply a Y2-level MCS down from the schedule, configured, and/or indicated MCS level for the UL resource, e.g., the adjusted MCS index may be the schedule, configured, and/or indicated MCS index$-Y2$. In examples, if $X \leq M2$, X may belong to a third interval for the multi-level MCS adjustment. The WTRU (e.g., if $X \leq M2$) may apply a Y3-level MCS down from the schedule, configured, and/or indicated MCS level for the UL resource, e.g., the adjusted MCS index may be the schedule, configured, and/or indicated MCS index$-Y3$.

In examples, each value of Y1, Y2, Y3, etc. may be pre-defined, pre-configured, and/or indicated for each interval (e.g., the first interval, the second interval, or the third interval, etc.), for example, for the multi-level dynamic MCS reduction. If the schedule, configured, and/or indicated MCS index$-Yk$ becomes out-of-range (e.g., below the lowest index), then the WTRU may apply the adjusted MCS index to be the lowest MCS index.

The WTRU may provide feedback and/or reporting, for example, on the MCS adjustments. Based on (e.g., after) transmission of the configured, scheduled, and/or indicated UL resource or after reception of a configured, scheduled, and/or indicated DL resource by applying a WTRU-initiated MCS adjustment (e.g., by following the general behavior for dynamic MCS adjustment, by applying the multi-level dynamic MCS adjustment, by the Mode 2 as one-level joint adjustment, and/or by the Mode 3 as multi-level joint adjustment, etc.), the WTRU may provide feedback and/or reporting on applied WTRU-initiated MCS adjustment(s), for example, to the network (e.g., gNB). The feedback/reporting on applied WTRU-initiated MCS adjustment(s) may be transmitted, for example, based on applying one or more of the following: transmitting (e.g., only) on a non-XDD slot/symbol (e.g., which may benefit the robustness of the WTRU feedback) or regardless of XDD/non-XDD slot/symbol type; periodic reporting, semi-persistent reporting, or aperiodic reporting; or the like.

The feedback/reporting on applied WTRU-initiated MCS adjustment(s) may be transmitted (e.g., only) on a non-XDD slot/symbol or regardless of XDD/non-XDD slot/symbol type. In examples, the transmission instance may be (e.g., explicitly) indicated by the network (e.g., gNB). The transmission instance may be (e.g., implicitly) determined, e.g., as the earliest possible non-XDD slot/symbol (e.g., at least after a time offset value). The time offset value may be configured, indicated, and/or determined, for example, based on a reported WTRU capability value related to the time offset.

In examples, WTRU feedback/reporting may be configured as a periodic (e.g., UCI-like) reporting, a semi-persistent (e.g., UCI-like) reporting, or an aperiodic (e.g., UCI-like) reporting, for example, based on a configured and/or indicated periodicity and/or offset parameter(s) and/or information on RB(s) for the WTRU feedback/reporting transmission.

In examples, based on (e.g., after) the WTRU feedback and/or reporting on applied WTRU-initiated MCS adjustment(s), the network (e.g., gNB) may indicate and/or update to the WTRU one or more parameter and/or value related to the WTRU-initiated MCS adjustment procedure (e.g., the adjustment step size (e.g., Y, Y1, Y2, Y3, etc.)), and/or the threshold value (e.g., M, M1, M2, M3, etc.), for example, to determine which interval to apply which step size for the WTRU-initiated MCS adjustment, etc.

Although features and elements described above are described in particular combinations, each feature or element may be used alone without the other features and elements of the preferred embodiments, or in various combinations with or without other features and elements.

Although the implementations described herein may consider 3GPP specific protocols, it is understood that the implementations described herein are not restricted to this scenario and may be applicable to other wireless systems. For example, although the solutions described herein consider LTE, LTE-A, New Radio (NR) or 5G specific protocols, it is understood that the solutions described herein are not restricted to this scenario and are applicable to other wireless systems as well.

The processes described above may be implemented in a computer program, software, and/or firmware incorporated in a computer-readable medium for execution by a computer and/or processor. Examples of computer-readable media include, but are not limited to, electronic signals (transmitted over wired and/or wireless connections) and/or computer-readable storage media. Examples of computer-readable storage media include, but are not limited to, a read only memory (ROM), a random access memory (RAM), a register, cache memory, semiconductor memory devices, magnetic media such as, but not limited to, internal hard disks and removable disks, magneto-optical media, and/or optical media such as compact disc (CD)-ROM disks, and/or digital versatile disks (DVDs). A processor in association with software may be used to implement a radio frequency transceiver for use in a WTRU, terminal, base station, RNC, and/or any host computer.

What is claimed is:

1. A wireless transmit/receive unit (WTRU) comprising:

a processor and a memory, wherein the processor is configured to:

receive an indication of one or more reference resource blocks (RBs);

receive a dynamic grant associated with transmission of an uplink (UL) signal, wherein the dynamic grant indicates a first set of RBs;

determine a frequency gap (FG) between the first set of RBs indicated by the dynamic grant and at least a first reference RB of the one or more reference RBs;

adjust one or more transmit (Tx) parameters based on the determined FG, wherein when the determined FG between the first set of RBs indicated by the dynamic grant and at least the first reference RB is less than a pre-defined threshold, the processor is configured to reduce one or more of the Tx parameters including a transmit power or a modulation coding scheme (MCS) level associated with transmission of the UL signal scheduled by the dynamic grant; and transmit the UL signal using the adjusted one or more Tx parameters.

2. The WTRU of claim 1, wherein the one or more reference RBs comprises a plurality of reference RBs, and the first reference RB used to determine the FG corresponds to a closest reference RB of the plurality of reference RBs to the first set of RBs.

3. The WTRU of claim 2, wherein the first set of RBs is between a second set of RBs and a third set of RBs, and wherein the second set of RBs comprises the first reference RB, the third set of RBs comprises a second reference RB of the plurality of reference RBs, and the first reference RB is selected for determining the FG based on the first set of RBs being closer to the second set of RBs than to the third set of RBs.

4. The WTRU of claim 3, wherein the first reference RB or the second reference RB is configured for a downlink (DL) transmission.

5. The WTRU of claim 1, wherein the UL signal is transmitted using one or more symbols, and wherein at least one of the one or more symbols is a mixed UL and downlink (DL) symbol in a bandwidth part.

6. The WTRU of claim 1, wherein the FG is a difference in frequency between the first set of RBs and the first reference RB.

7. The WTRU of claim 1, wherein the one or more Tx parameters comprises a MCS level, a transmit power, or a link adaptation parameter.

8. The WTRU of claim 1, wherein the transmit power or the MCS level is adjusted based on multiple thresholds.

9. The WTRU of claim 1, wherein the pre-defined threshold is a first pre-defined threshold, and wherein the processor is configured to:

adjust a first Tx parameter of the one or more Tx parameters when the FG is less than the first pre-defined threshold and greater than a second pre-defined threshold; and adjust a second Tx parameter of the one or more Tx parameters when the FG is less than the first pre-defined threshold and less than the second pre-defined threshold.

10. The WTRU of claim 1, wherein the processor is configured to receive an explicit identification of at least one of the one or more reference RBs.

11. A method implemented by a wireless transmit/receive unit (WTRU), the method comprising:

receiving an indication of one or more reference resource blocks (RBs);

receiving a dynamic grant associated with transmission of an uplink (UL) signal, wherein the dynamic grant indicates a first set of RBs;

determining a frequency gap (FG) between the first set of RBs indicated by the dynamic grant and at least a first reference RB of the one or more reference RBs;

adjusting one or more transmit (Tx) parameters based on the determined FG, wherein, when the determined FG between the first set of RBs indicated by the dynamic grant and at least the first reference RB is less than a pre-defined threshold, adjusting the one or more Tx parameters comprises reducing one or more of a transmit power or a modulation coding scheme (MCS) level associated with transmission of the UL signal scheduled by the dynamic grant; and transmitting the UL signal using the adjusted one or more Tx parameters.

12. The method of claim 11, wherein the one or more reference RBs comprises a plurality of reference RBs, and the first reference RB used to determine the FG corresponds to a closest reference RB of the plurality of reference RBs to the first set of RBs.

13. The method of claim 12, wherein the first set of RBs is between a second set of RBs and a third set of RBs, and wherein the second set of RBs comprises the first reference RB, the third set of RBs comprises a second reference RB of the plurality of reference RBs, and the first reference RB is selected for determining the FG based on the first set of RBs being closer to the second set of RBs than to the third set of RBs.

14. The method of claim 13, wherein the first reference RB or the second reference RB is configured for a downlink (DL) transmission.

15. The method of claim 11, wherein the UL signal is transmitted using one or more symbols, and wherein at least one of the one or more symbols is a mixed UL and downlink (DL) symbol in a bandwidth part.

16. The method of claim 11, wherein the FG is a difference in frequency between the first set of RBs and the first reference RB.

17. The method of claim 11, wherein the one or more Tx parameters comprises a MCS level, a transmit power, or a link adaptation parameter.

18. The method of claim 11, wherein the transmit power or the MCS level is adjusted based on multiple thresholds.

19. The method of claim 11, wherein the pre-defined threshold is a first pre-defined threshold, and further comprising:

adjusting a first Tx parameter of the one or more Tx parameters when the FG is less than the first pre-defined threshold and greater than a second pre-defined threshold; and adjusting a second Tx parameter of the one or more Tx parameters when the FG is less than the first pre-defined threshold and less than the second pre-defined threshold.

20. The method of claim 11, further comprising:

receiving an explicit identification of at least one of the one or more reference RBs.

* * * * *